US010210236B2

(12) United States Patent
Procops et al.

(10) Patent No.: US 10,210,236 B2
(45) Date of Patent: Feb. 19, 2019

(54) STORING AND RETRIEVING DATA OF A DATA CUBE

(71) Applicant: Ab Initio Technology LLC, Lexington, MA (US)

(72) Inventors: Roy Procops, Winchester, MA (US); David Trahan, Boylston, MA (US)

(73) Assignee: Ab Initio Technology LLC, Lexington, MA (US)

( * ) Notice: Subject to any disclaimer, the term of this patent is extended or adjusted under 35 U.S.C. 154(b) by 440 days.

(21) Appl. No.: 14/949,391

(22) Filed: Nov. 23, 2015

(65) Prior Publication Data

US 2017/0147674 A1    May 25, 2017

(51) Int. Cl.
*G06F 7/00*    (2006.01)
*G06F 17/30*    (2006.01)

(52) U.S. Cl.
CPC .. *G06F 17/30592* (2013.01); *G06F 17/30106* (2013.01); *G06F 17/30292* (2013.01); *G06F 17/30563* (2013.01); *G06F 17/30569* (2013.01); *G06F 17/30598* (2013.01)

(58) Field of Classification Search
CPC .............................................. G06F 17/30592
See application file for complete search history.

(56) References Cited

U.S. PATENT DOCUMENTS

| 8,229,902 B2 | 7/2012 | Meriwether et al. |
| 2003/0126143 A1* | 7/2003 | Roussopoulos ... G06F 17/30592 |
| 2005/0246357 A1* | 11/2005 | Geary ............... G06F 17/30592 |

OTHER PUBLICATIONS

International Search Report and Written Opinion issued in PCT/US2016/062258, dated Feb. 17, 2017.
Garcia-Molina et al., "Advanced Topics in Relational Databases" Database Systems The Complete Book Second Edition, pp. 425-480.
Gray et al., "Data cube: a relational aggregation operator generalizing Group-By, Cross-Tab, and Sub-Totals", Data Engineering, 1996, Proceedings of the Twelfth International Conference on New Orleans (Feb. 1-Mar. 1996), IEEE Comput. Soc, US (1996), pp. 152-159, XP010158909.

* cited by examiner

*Primary Examiner* — Ajith Jacob
(74) *Attorney, Agent, or Firm* — Fish & Richardson P.C.

(57) ABSTRACT

Among other things, we describe a technique for storing data of a data cube in one or more flat files. We also describe a technique for processing a query to access data of a data cube. These techniques can be implemented in a number of ways, including as a method, system, and/or computer program product stored on a computer readable storage device. One of the techniques includes receiving a set of data records having at least two dimensions, generating a set of grouped data records ordered by cardinality, and generating and storing at least one flat file containing the set of grouped data records, wherein a particular data record of the grouped data records includes a primary key that can be used to identify data of the particular data record in response to a request.

46 Claims, 13 Drawing Sheets

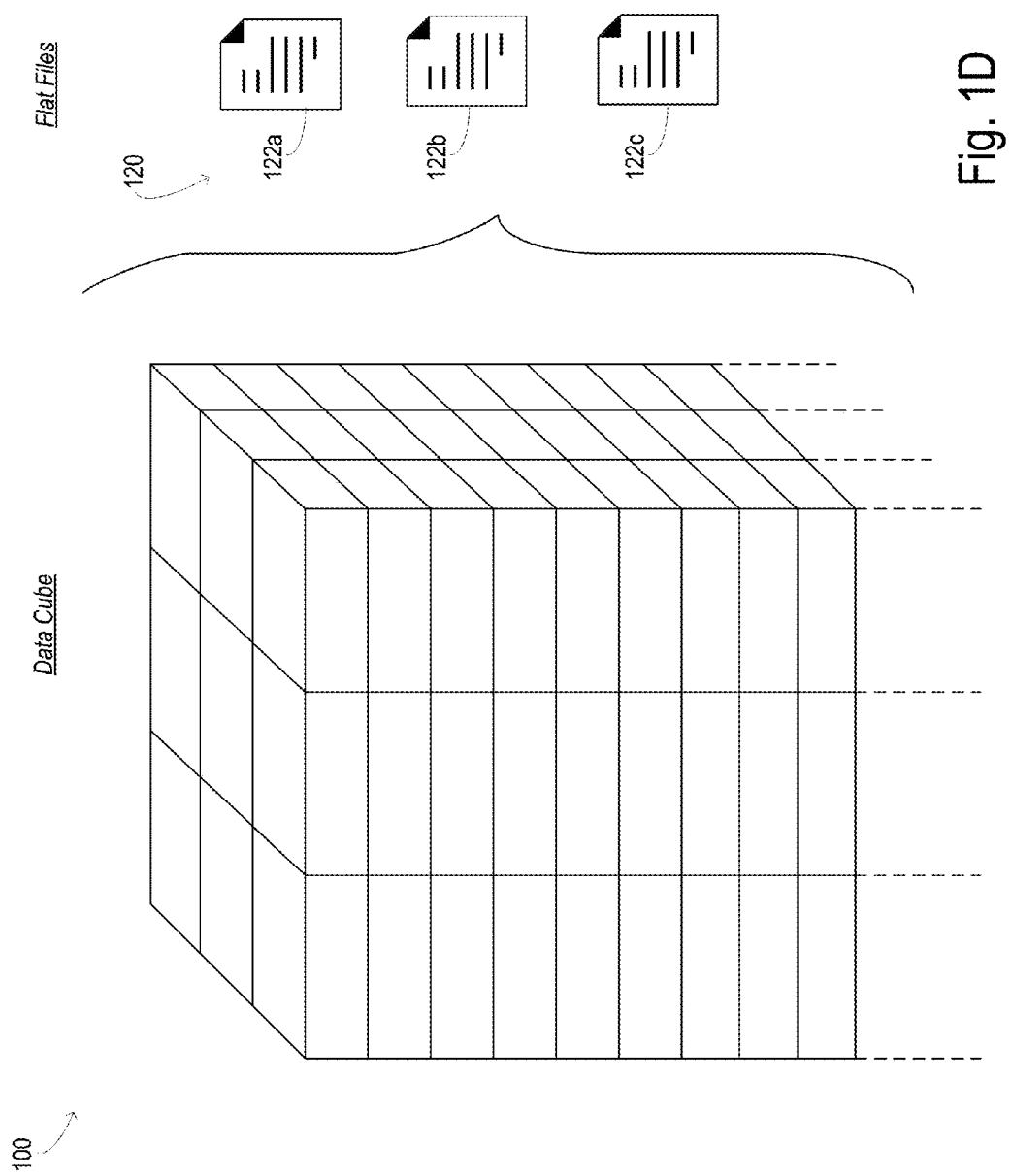

| Record Identifier | RunID | Detail Mask | Customer Status | Gender | Location | | | Primary Key |
| --- | --- | --- | --- | --- | --- | --- | --- | --- |
| | | | | | State | City | ZIP code | |
| 30 | 1 | 0AC | 0 | Female (101) | CA (201) | Hollywood (302) | 90068 (404) | {1, 0AC, 0, 101, 201, 302, 404} |

| Record # | RunID | Detail Mask | Customer Status | Gender | State | City | ZIP code |
|---|---|---|---|---|---|---|---|
| 1 | 1 | 000 | {0} | {0} | {0} | {0} | {0} |
| 2 | 1 | 00A | {0} | {0} | CA (201) | {0} | {0} |
| 3 | 1 | 00A | {0} | {0} | MA (202) | {0} | {0} |
| 4 | 1 | 00A | {0} | {0} | NY (203) | {0} | {0} |
| 5 | 1 | 00B | {0} | {0} | CA (201) | Berkeley (301) | {0} |
| 6 | 1 | 00B | {0} | {0} | NY (203) | New York (305) | {0} |
| 7 | 1 | 00C | {0} | {0} | CA (201) | Berkeley (301) | 94608 (401) |
| 8 | 1 | 00C | {0} | {0} | CA (201) | Berkeley (301) | 94609 (402) |
| 9 | 1 | 00C | {0} | {0} | CA (201) | Hollywood (302) | 90028 (403) |
| 10 | 1 | 00C | {0} | {0} | NY (203) | New York (305) | 10453 (408) |
| 11 | 1 | 00C | {0} | {0} | NY (203) | New York (305) | 10457 (409) |
| 12 | 1 | 0A0 | {0} | Female (101) | {0} | {0} | {0} |
| 13 | 1 | 0A0 | {0} | Male (102) | {0} | {0} | {0} |
| 14 | 1 | 0A0 | {0} | Unspecified (103) | {0} | {0} | {0} |
| 15 | 1 | 0AA | {0} | Female (101) | CA (201) | {0} | {0} |
| 16 | 1 | 0AA | {0} | Female (101) | MA (202) | {0} | {0} |
| 17 | 1 | 0AA | {0} | Unspecified (103) | CA (201) | {0} | {0} |
| 18 | 1 | 0AA | {0} | Unspecified (103) | MA (202) | {0} | {0} |
| 19 | 1 | 0AA | {0} | Unspecified (103) | NY (203) | {0} | {0} |
| 20 | 1 | 0AB | {0} | Female (101) | CA (201) | Berkeley (301) | {0} |
| 21 | 1 | 0AB | {0} | Female (101) | CA (201) | Hollywood (302) | {0} |
| 22 | 1 | 0AB | {0} | Female (101) | MA (202) | Boston (303) | {0} |
| 23 | 1 | 0AB | {0} | Female (101) | NY (203) | Albany (304) | {0} |
| 24 | 1 | 0AB | {0} | Unspecified (103) | CA (201) | Hollywood (302) | {0} |
| 25 | 1 | 0AB | {0} | Unspecified (103) | MA (202) | Boston (303) | {0} |
| 26 | 1 | 0AB | {0} | Unspecified (103) | NY (203) | Albany (304) | {0} |
| 27 | 1 | 0AB | {0} | Unspecified (103) | NY (203) | New York (305) | {0} |
| 28 | 1 | 0AC | {0} | Female (101) | CA (201) | Berkeley (301) | 94608 (401) |
| 29 | 1 | 0AC | {0} | Female (101) | CA (201) | Berkeley (301) | 94609 (402) |
| 30 | 1 | 0AC | {0} | Female (101) | CA (201) | Hollywood (302) | 90028 (403) |

| Record # | RunID | Detail Mask | Customer Status | Gender | State | City | ZIP code |
|---|---|---|---|---|---|---|---|
| 31 | 1 | 0AC | (0) | Female (101) | CA (201) | Hollywood (302) | 90068 (404) |
| 32 | 1 | 0AC | (0) | Female (101) | MA (202) | Boston (303) | 02120 (405) |
| 33 | 1 | 0AC | (0) | Female (101) | NY (203) | Albany (304) | 12203 (406) |
| 34 | 1 | 0AC | (0) | Female (101) | NY (203) | Albany (304) | 12204 (407) |
| 35 | 1 | 0AC | (0) | Unspecified (103) | CA (201) | Berkeley (301) | 94609 (402) |
| 36 | 1 | 0AC | (0) | Unspecified (103) | CA (201) | Hollywood (302) | 90028 (403) |
| 37 | 1 | 0AC | (0) | Unspecified (103) | CA (201) | Hollywood (302) | 90068 (404) |
| 38 | 1 | 0AC | (0) | Unspecified (103) | MA (202) | Boston (303) | 02120 (405) |
| 39 | 1 | 0AC | (0) | Unspecified (103) | NY (203) | Albany (304) | 12203 (406) |
| 40 | 1 | 0AC | (0) | Unspecified (103) | NY (203) | Albany (304) | 12204 (407) |
| 41 | 1 | 0AC | (0) | Unspecified (103) | NY (203) | New York (305) | 10453 (408) |
| 42 | 1 | 0AC | (0) | Unspecified (103) | NY (203) | New York (305) | 10457 (409) |
| 43 | 1 | A00 | active (1) | (0) | (0) | (0) | (0) |
| 44 | 1 | A00 | inactive (2) | (0) | (0) | (0) | (0) |
| 45 | 1 | A00 | preferred (3) | (0) | (0) | (0) | (0) |
| 46 | 1 | A0A | active (1) | (0) | CA (201) | (0) | (0) |
| 47 | 1 | A0A | active (1) | (0) | MA (202) | (0) | (0) |
| 48 | 1 | A0A | active (1) | (0) | NY (203) | (0) | (0) |
| 49 | 1 | A0A | preferred (3) | (0) | NY (203) | (0) | (0) |
| 50 | 1 | A0B | active (1) | (0) | CA (201) | Berkeley (301) | (0) |
| 51 | 1 | A0B | active (1) | (0) | CA (201) | Hollywood (302) | (0) |
| 52 | 1 | A0B | preferred (3) | (0) | NY (203) | Albany (304) | (0) |
| 53 | 1 | A0B | preferred (3) | (0) | NY (203) | New York (305) | (0) |
| 54 | 1 | A0C | active (1) | (0) | CA (201) | Berkeley (301) | 94608 (401) |
| 55 | 1 | A0C | active (1) | (0) | CA (201) | Berkeley (301) | 94609 (402) |
| 56 | 1 | A0C | preferred (3) | (0) | NY (203) | Albany (304) | 12204 (407) |
| 57 | 1 | A0C | preferred (3) | (0) | NY (203) | New York (305) | 10453 (408) |
| 58 | 1 | A0C | preferred (3) | (0) | NY (203) | New York (305) | 10457 (409) |
| 59 | 1 | AA0 | active (1) | Female (101) | (0) | (0) | (0) |
| 60 | 1 | AA0 | active (1) | Male (102) | (0) | (0) | (0) |

Fig. 5B

| Record # | RunID | Detail Mask | Customer Status | Gender | State | City | ZIP code |
|---|---|---|---|---|---|---|---|
| 208 | 1 | AAC | active (1) | Female (101) | CA (201) | Berkeley (301) | 94608 (401) |
| 209 | 1 | AAC | active (1) | Female (101) | CA (201) | Berkeley (301) | 94609 (402) |
| 210 | 1 | AAC | active (1) | Female (101) | CA (201) | Hollywood (302) | 90028 (403) |
| 211 | 1 | AAC | active (1) | Female (101) | CA (201) | Hollywood (302) | 90068 (404) |
| 212 | 1 | AAC | active (1) | Female (101) | MA (202) | Boston (303) | 02120 (405) |
| 213 | 1 | AAC | active (1) | Female (101) | NY (203) | Albany (304) | 12203 (406) |
| 214 | 1 | AAC | active (1) | Female (101) | NY (203) | Albany (304) | 12204 (407) |
| 215 | 1 | AAC | active (1) | Female (101) | NY (203) | New York (305) | 10453 (408) |
| 216 | 1 | AAC | active (1) | Female (101) | NY (203) | New York (305) | 10457 (409) |
| 217 | 1 | AAC | active (1) | Male (102) | CA (201) | Berkeley (301) | 94608 (401) |
| 218 | 1 | AAC | active (1) | Male (102) | CA (201) | Berkeley (301) | 94609 (402) |
| 219 | 1 | AAC | active (1) | Male (102) | CA (201) | Hollywood (302) | 90028 (403) |
| 220 | 1 | AAC | active (1) | Male (102) | CA (201) | Hollywood (302) | 90068 (404) |
| 221 | 1 | AAC | active (1) | Male (102) | MA (202) | Boston (303) | 02120 (405) |
| 222 | 1 | AAC | active (1) | Male (102) | NY (203) | Albany (304) | 12203 (406) |
| 223 | 1 | AAC | active (1) | Male (102) | NY (203) | Albany (304) | 12204 (407) |
| 224 | 1 | AAC | active (1) | Male (102) | NY (203) | New York (305) | 10453 (408) |
| 225 | 1 | AAC | active (1) | Male (102) | NY (203) | New York (305) | 10457 (409) |
| 226 | 1 | AAC | active (1) | Unspecified (103) | CA (201) | Berkeley (301) | 94608 (401) |
| 227 | 1 | AAC | active (1) | Unspecified (103) | CA (201) | Berkeley (301) | 94609 (402) |
| 228 | 1 | AAC | active (1) | Unspecified (103) | CA (201) | Hollywood (302) | 90028 (403) |
| 229 | 1 | AAC | active (1) | Unspecified (103) | CA (201) | Hollywood (302) | 90068 (404) |
| 230 | 1 | AAC | active (1) | Unspecified (103) | MA (202) | Boston (303) | 02120 (405) |
| 231 | 1 | AAC | active (1) | Unspecified (103) | NY (203) | Albany (304) | 12203 (406) |
| 232 | 1 | AAC | active (1) | Unspecified (103) | NY (203) | Albany (304) | 12204 (407) |
| 233 | 1 | AAC | active (1) | Unspecified (103) | NY (203) | New York (305) | 10453 (408) |
| 234 | 1 | AAC | active (1) | Unspecified (103) | NY (203) | New York (305) | 10457 (409) |
| 235 | 1 | AAC | inactive (2) | Female (101) | CA (201) | Berkeley (301) | 94608 (401) |
| 236 | 1 | AAC | inactive (2) | Female (101) | CA (201) | Berkeley (301) | 94609 (402) |
| 237 | 1 | AAC | inactive (2) | Female (101) | CA (201) | Hollywood (302) | 90028 (403) |

Fig. 5C

| Dimension: Value | Related Dimension: Value |
|---|---|
| City: Berkeley (301) | State: CA (201) |
| City: Hollywood (302) | State: CA (201) |
| City: Boston (303) | State: MA (202) |
| City: Albany (304) | State: NY (203) |
| City: New York (305) | State: NY (203) |
| ... | ... |
| ZIP code: 94608 (401) | City: Berkeley (301); State: CA (201) |
| ZIP code: 94609 (402) | City: Berkeley (301); State: CA (201) |
| ... | ... |

Fig. 6

STORING AND RETRIEVING DATA OF A DATA CUBE

TECHNICAL FIELD

This application relates to data structures and methods for storing and retrieving of data of a data cube, e.g. for applications in high-speed data processing and network communications.

BACKGROUND

A data cube is a collection of data having multiple dimensions. A dimension is an attribute of interest. Thus, data stored in a data cube can have values for one or more of the attributes.

SUMMARY

Among other things, we describe a technique for storing data of a data cube in one or more flat files. A data cube is a collection of data that can be queried based on criteria that apply to multiple dimensions. A data cube may be a two-, three- or higher dimensional array of data values. A flat file is a collection of data, such as data records, having no structured relationships among the records. The file is flat, which means the file may have no structure for indexing. A flat file can be, e.g., a plain text file or a binary file. The flat files can be stored in a tangible, non-transitory computer-readable medium. The technique includes receiving a set of data records, the set of data records having at least two dimensions, at least some of the data records each including respective data values for each of the at least two dimensions; generating a set of grouped data records ordered by cardinality, the generating including grouping the data records into subsets according to data values of a first dimension of the at least two dimensions, the first dimension having fewer possible data values than a number of possible data values for a second dimension, arranging the subsets of the grouped data records according to the data values of the first dimension and according to a sorting criterion, and arranging the data records of the subsets of the grouped data records according to data values of the second dimension of the at least two dimensions, such that data records of each respective subset of the grouped data are sorted by the values of the second dimension; and generating and storing at least one flat file containing the set of grouped data records; wherein a particular data record of the grouped data records includes a primary key that can be used to identify data of the particular data record in response to a request.

We also describe a technique for processing a query to access data of a data cube. The data can be stored in a tangible, non-transitory computer-readable medium. The technique includes receiving a query; based on the query, identifying a data cube storing data records; computing at least one detail mask for the query, the detail mask including a representation of one or more detail levels, each detail level corresponding to a hierarchy of a dimension of the data records, wherein a first dimension of the at least two dimensions has fewer possible data values than a number of possible data values for a second dimension; and using the computed detail mask to retrieve, from a system other than a relational database, one or more data records responsive to the query.

These techniques can be implemented in a number of ways, including as a method, system, and/or computer program product stored on a computer readable storage device.

Aspects of these techniques can include one or more of the following advantages. Data stored in a data cube can be accessed in a way that maximizes speed and minimizes the amount of processing power needed, especially useful for high-speed network communications. For example, an index compressed flat file (ICFF) can be used to store the data of the data cube. Because data is not modified after it is written to an ICFF, data can be read from an ICFF without the use of a locking technique. Further, because data is not modified after it is written to an ICFF, old data can be easily identified and discarded if the resources (e.g., storage space) used by the old data are needed for other purposes. Further, because data in an ICFF can be directly read from data files, the data in an ICFF can potentially be read from more quickly than techniques that require a read command to be executed by an intermediate system such as a relational database management system. Further, because data in an ICFF is typically compressed, the data may use less storage space than data stored using other techniques. Further, the number of read operations performed upon the ICFF can be minimized by grouping the data in a particular way.

DESCRIPTION OF DRAWINGS

FIGS. 1A-1D show a graphical representation of a data cube.

FIG. 4 shows an example of a data record of the ICFF.

FIGS. 5A-C show an example of a table representing sample data records that are sorted according to a primary key.

FIG. 6 shows an example of a census for determining related dimension values.

Like reference symbols in the various drawings indicate like elements.

DESCRIPTION

Figure 1A:
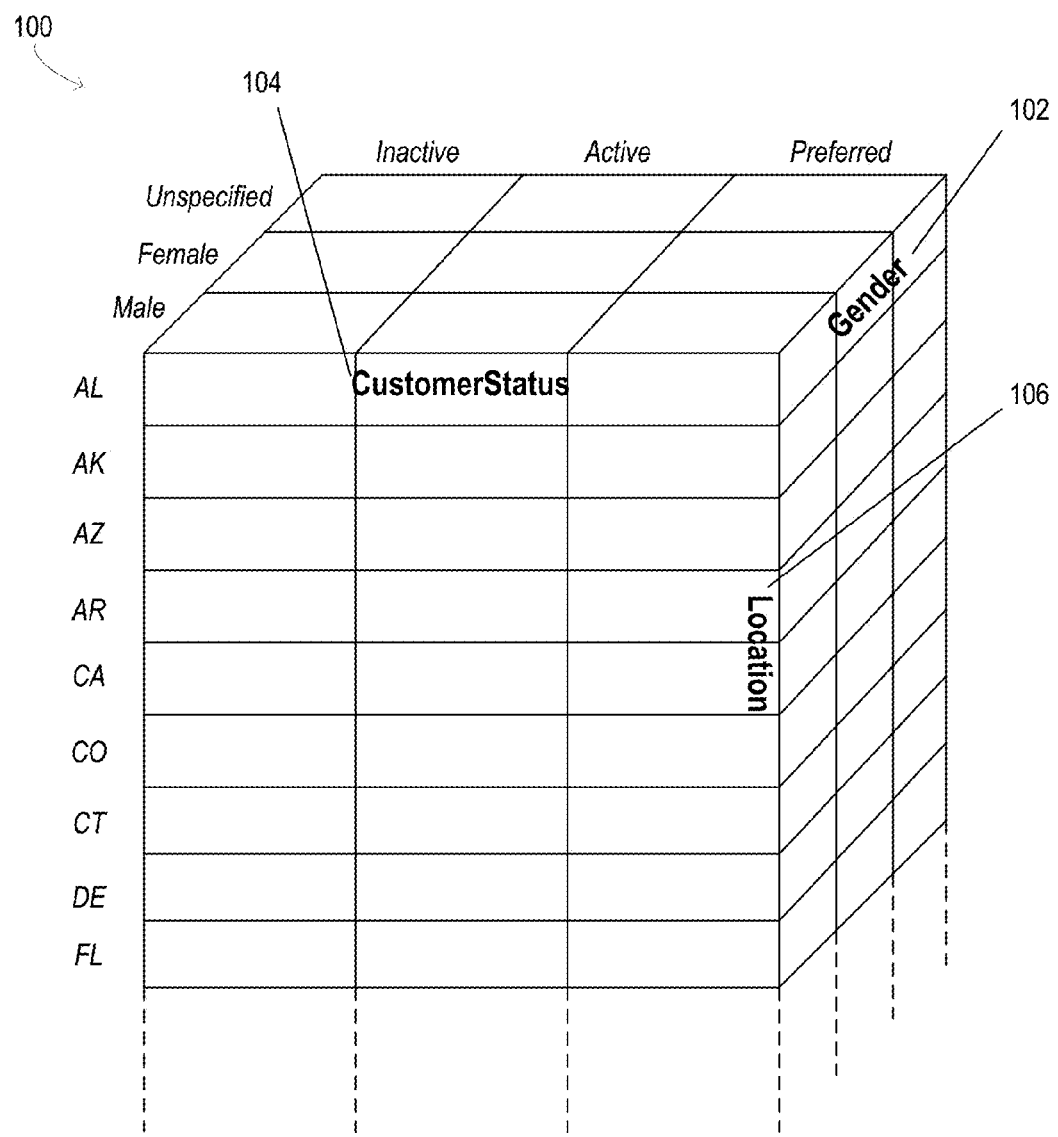

A data cube (e.g., an Online Analytical Processing cube, or an OLAP cube) can be stored in an index compressed flat file (ICFF), and data stored in the data cube can be queried. A data cube is a collection of data that can be queried based on criteria that apply to multiple dimensions. A data cube may be a two-, three- or higher dimensional array of data values. A dimension is a category of data, and a collection of data can have values for any number of dimensions. For example, in a storage medium that stores customer data in which customer status, gender, and location are dimensions, a query could specify the return of data describing customers who are active and female and live in Massachusetts, or customers who are inactive of any gender and who live in Boston. In this example, location can be a hierarchy of dimensions rather than a single dimension, e.g., location can include dimensions representing state, city, and ZIP code, respectively. A dimension that includes multiple dimensions is sometimes generally referred to herein as a hierarchy. Multiple sets of data each containing values for two or more dimensions can together be called a data cube. Put another way, a data cube may be a logical model for data having two or more dimensions.

Data in a data cube can be accessed efficiently if the data is stored in an ICFF format. ICFF is a data format in which data is written to a series of flat files that are typically compressed. Once data is written to one of the files, the data is not modified. A collection of files formatted according to ICFF is sometimes referred to in shorthand as an ICFF. An ICFF is not a relational database. In contrast to an ICFF, a relational database is a collection of data records arranged in tables, such that the tables have structured relationships among each other. A relational database is typically managed by a relational database management system, sometimes referred to in shorthand as an RDBMS.

The use of an ICFF may have advantages over the use of another data storage technique such as a relational database. For example, because data is not modified after it is written to an ICFF, data can be read from an ICFF without the use of a locking technique, since no other entity will be writing to a particular portion of the ICFF at the same time as data is read from that portion. Thus, data can be written to and read from an ICFF without setting locks, which otherwise takes time and processing power, or waiting for locks to be released, which otherwise increases latency. As another example, because data is not modified after it is written to an ICFF, old data can be easily identified and discarded if the resources (e.g., storage space) used by the old data are needed for other purposes. Further, because data in an ICFF can be directly read from data files, the data in an ICFF can potentially be read from more quickly than techniques that require a read command to be interpreted and executed by an intermediate system such as a relational database management system. Further, because data in an ICFF is typically compressed, the data may use less storage space than data stored using other techniques.

Data in an ICFF can be accessed based on a primary key (sometimes referred to as a sort key or a cube sort key). A primary key is a unique value that corresponds to the location of a set of data within the ICFF and can be used to access the corresponding set of data. In this way, the primary key serves as an index to the data stored in the ICFF. Each unique record stored in the ICFF has a unique value for its primary key. For example, each record in an ICFF may be a collection of fields each storing a piece of data, and one of the fields can be for storing the primary key for the record. While some of the fields in a record may contain the same data as the corresponding fields in other records, the primary key for each record will be unique. For example, multiple records representing customers may have a field called "gender" in which the data in all of those records is "female," but each of those records will have their own respective unique value for the "primary key" field. A primary key of a record can sometimes include data from one or more fields of the record as long as the primary key is likely to be unique to its respective record.

The data can be stored in the ICFFs in a manner that groups data together based on how likely a contiguous group of data records will be responsive to a single query. A flat file is a collection of data, such as data records, having no structured relationships among the records. In contrast, data stored by a relational database management system typically includes records having structured relationships among the records. Because ICFFs are flat files, each entry is accessed by reading data from a specified location in each file. Further, the data can be arranged in the ICFFs so that the primary key can be used to identify the location in the ICFFs of the record corresponding to the primary key. For example, a facility configured to access data in the ICFFs can store an index of primary keys and corresponding locations in the ICFFs. In this way, a query containing a primary key can be submitting to the facility, and the corresponding data can be returned. However, submitting and processing a query requires an amount of data processing overhead that could slow down data access and retrieval if many records are being accessed at once.

If data responsive to a particular query is grouped together continuously in an ICFF, the data can be retrieved from the ICFF by accessing a single range of data locations. Further, if the primary key is chosen to allow for multiple adjacent records to be accessed at once in many cases, then the data retrieval efficiency of the system will be improved for those cases. In contrast, if the data responsive to a particular query is not grouped together, an entity retrieving the data will have to access multiple ranges of data locations, slowing down data retrieval. The system described here uses a primary key chosen to increase the likelihood that multiple records responsive to a query will be grouped together in an ICFF and can thus be retrieved by accessing a single range (or a relatively small number of ranges) of data locations. Examples of ICFFs are described in greater detail in U.S. Pat. No. 8,229,902, titled "Managing Storage of Individually Accessible Data Units"; U.S. Patent Publication No. 2014/0258650, titled "Managing Operations on Stored Data Units"; U.S. Patent Publication No. 2014/0258651, also titled "Managing Operations on Stored Data Units"; and U.S. Patent Publication No. 2014/0258652, also titled "Managing Operations on Stored Data Units"; all of which are incorporated herein by reference.

Data Cube Overview

FIG. 1A shows a graphical representation of a data cube 100. A data cube can be thought of as a plurality of tables stacked on each other. While the word "cube" would otherwise imply that a data cube has three dimensions, a data cube can have any number of dimensions. In this example, the data cube has five dimensions: Gender, CustomerStatus, State, City, and ZIP code. However, only the Gender, CustomerStatus, and State dimensions are shown in this particular representation of the data cube 100.

The dimensions of the data cube are organized into hierarchies. In this example, the data cube has three hierarchies: Gender 102, CustomerStatus 104, and Location 106. The Location hierarchy 106 includes the State, City, and Zip code dimensions. The Gender hierarchy 102 includes only the Gender dimension. The CustomerStatus hierarchy 104 includes only the CustomerStatus dimension. Dimensions that represent the only dimension of a hierarchy (e.g., Gender and CustomerStatus) are sometimes referred to as non-hierarchical dimensions.

Each dimension has one or more possible values. For example, the Gender dimension has "Male," "Female," and "Unspecified" as possible values, the CustomerStatus dimension has "Inactive," "Active," and "Preferred" as possible values, the State dimension has the 50 U.S. state abbreviations as possible values, the City dimension has all U.S. cities as possible values, and the ZIP code dimension has all U.S. ZIP codes as possible values. In some examples, the data cube described here could be expanded to allow it to store more detailed information with the addition of more dimensions (e.g., by adding a Country dimension).

A user can request records by querying the data cube according to a query technique. In some implementations, the query is a Structured Query Language query (sometimes called an SQL query), and the data cube can be accessed via an interface (e.g., a user interface, or another kind of interface such as an application programming interface) that receives SQL queries for processing. Queries having SQL syntax are described later in this document. For the purpose of readability, several examples are provided that use "plain English" queries. A typical query processing implementation would not process these "plain English" queries, but rather would use queries defined in SQL or another query language.

A query can include a specification of a level of detail that the user desires for each hierarchy. For example, the query "For each state, broken down by gender, how many purchases were made?" requires State level detail in the Location hierarchy 106 and Gender level detail (the only level of detail available) in the Gender hierarchy 102. Records produced by such a query would include fields that are populated with values for the State and Gender dimensions. The records would also include fields that are populated with measures that are relevant to the query. Measures are values (typically numerical values) that are aggregated at different levels of dimensional detail. In this example, the data cube would have a NumberOfPurchases measure that allows the data cube to answer the query. Fields for the other dimensions (e.g., City, Zipcode, and CustomerStatus) would be unpopulated.

Although SQL queries are often used, we will use plain-English queries here as an example for the purpose of clarity. For example, the query "For each state, broken down by gender, how many purchases were made?" may return the following records:

| State | Gender | NumberOfPurchases |
|-------|--------|-------------------|
| CA | Male | 4,583 |
| NY | Female | 8,454 |
| MA | Unspecified | 473 |

In another example, the query "For each city, how many purchases were made by males?" requires City level detail in the Location hierarchy 106 and Gender level detail in the Gender hierarchy 102. Records produced by such a query would include fields that are populated with values for the State, City, and Gender dimensions. The query may return the following records:

| State | City | Gender | NumberOfPurchases |
|-------|------|--------|-------------------|
| CA | Los Angeles | Male | 437 |
| NY | New York | Male | 348 |
| CA | San Francisco | Male | 313 |
| MA | Boston | Male | 213 |
| CA | San Diego | Male | 211 |

Figure 1B:
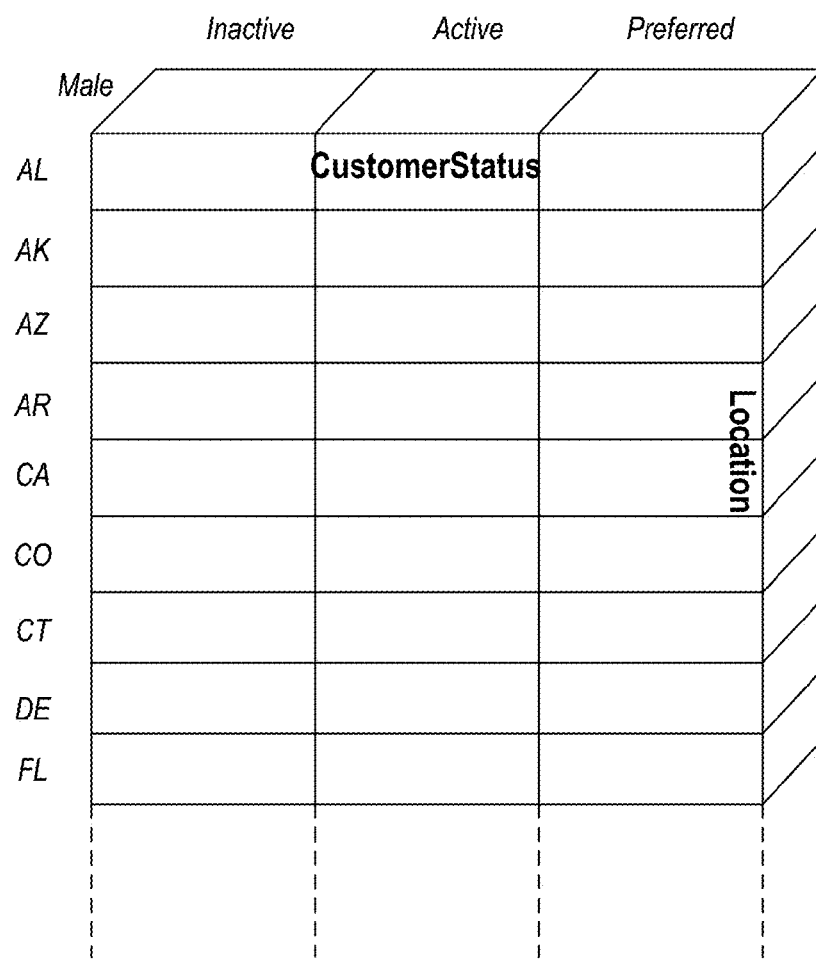
Figure 1C:
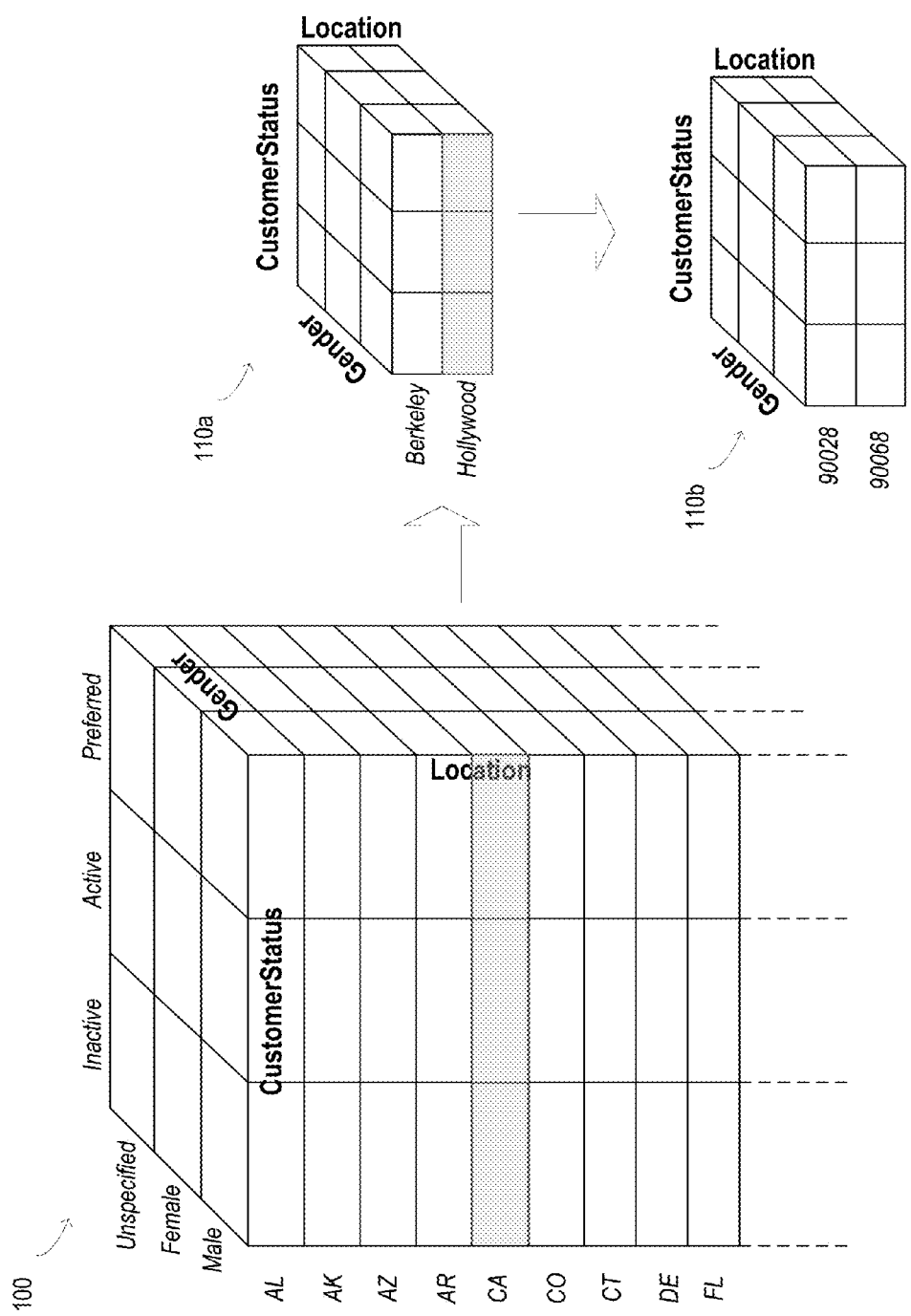

In this way, a data cube can be queried to obtain "slices" of data stored in the data cube, e.g., a portion of the stored data in which the dimensions of the returned data are constrained in a manner specified by the query. A data cube can be thought of as containing many overlapping slices of data. FIGS. 1B and 1C show visualizations of data in the data cube and the way in which subsets of the data can overlap.

FIG. 1B shows an example of a slice 108 of data (e.g., a subset of a data cube's data that has a particular value for one or more of its dimensions). In this example, the slice 108 includes data that has a value of "Male" for the Gender dimension. The data is broken down by State and CustomerStatus. Thus, the data in this slice 108 might be responsive to a query requesting measures for all males broken down by State and CustomerStatus. To create the data represented by the slice 108, a computing system would have precomputed measures corresponding to different values of State and CustomerStatus for data records with a value of "Male" for Gender. This typically occurs at the same time that measures corresponding to other slices were computed. For example, data of other slices might have been pre-computed for data records with a value of "Female" and "Unspecified." Slices would also have been pre-computed for data records with a particular value for other dimensions. For example, a slice can be pre-computed for data records with a value of "Inactive" for CustomerStatus, and such data records can be broken down by State and Gender.

Because the data cube contains measures of data, aggregates of measures can be pre-computed such that a detail level of a particular dimension in a query can be dynamically altered, thereby reducing the amount of processing time and power required upon receipt of the query. Briefly referring to FIG. 1A, the data in the data cube 100 is shown broken down in State level detail for the Location dimension. A user may wish to obtain data at the City level of detail instead of the State level. Thus, as shown in FIG. 1C, a system can quickly retrieve data at City level detail stored in the data cube 100. In this example, City level detail 110a is shown for data that has a value of "CA" for the State dimension. Because the data has been pre-computed for all combinations of dimensions and all combinations of dimensional detail, the system does not need to perform such processing on demand. Further, a different query can be performed on data to cause the system to retrieve data at ZIP code level detail 110b. In this example, ZIP code level detail is shown for data that has a value of "Hollywood" for the City dimension. This detail level can be used to obtain measures broken down by ZIP code, for example, instead of by City.

A data cube 100 implemented using the techniques described in this document can be stored in an ICFF. For example, as shown in FIG. 1D, the data of the data cube 100 can be stored in a collection 120 of flat files 122a, 122b, 122c that store data formatted according to an ICFF technique. The data can be accessed using techniques described herein.

How Data is Stored in the Data Cube

Records are returned in response to a query based on a query technique, sometimes referred to as a query algorithm. However, before discussing the details of the query algorithm, we will first describe how data is stored in the data cube in order to provide the framework for understanding how the query algorithm works.

Figure 2:
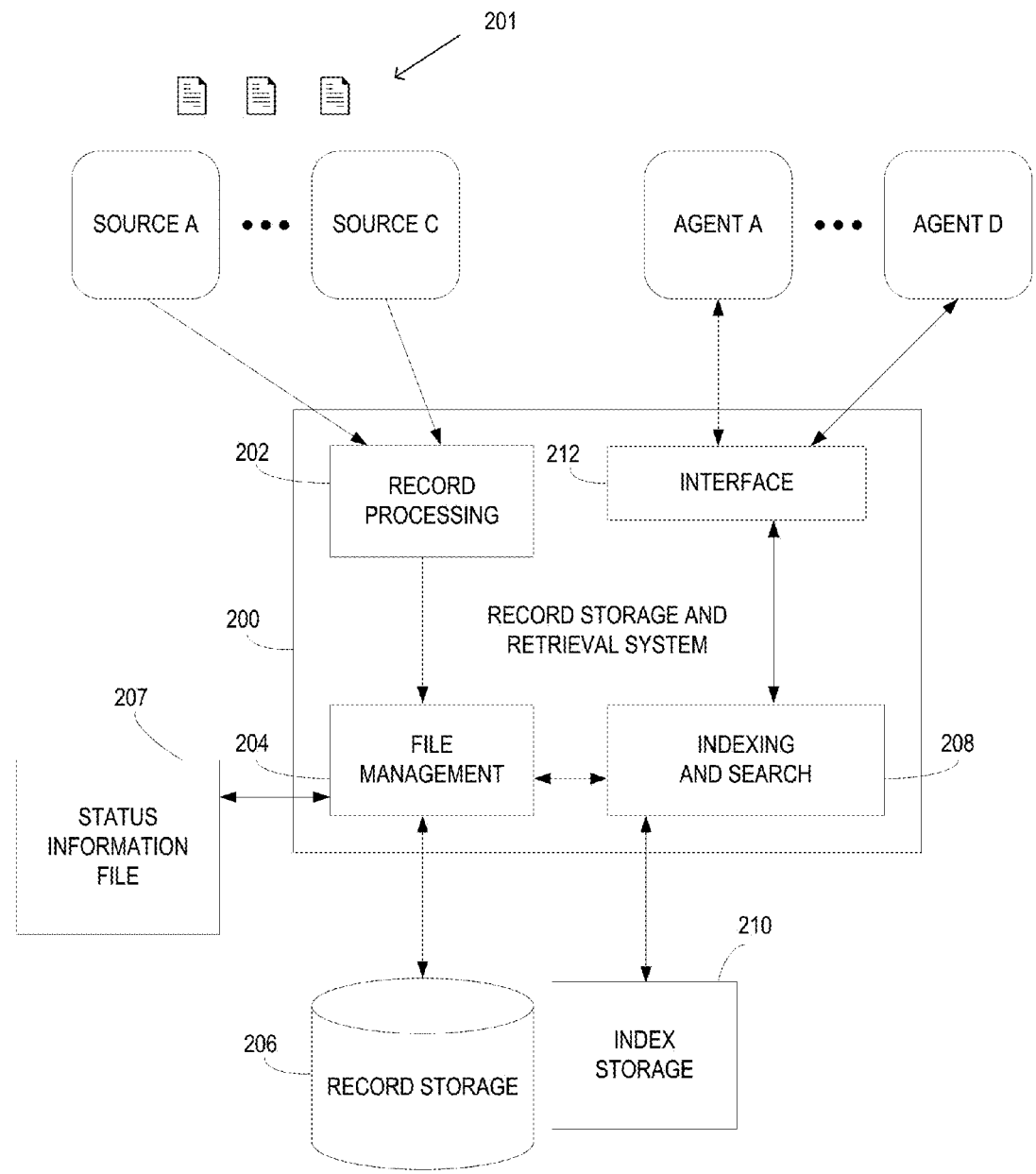
FIG. 2 shows a record storage and retrieval system.

As noted above, the data cube can be stored in an ICFF. Referring to FIG. 2, a record storage and retrieval system 200 receives a set of data records, such as multiple data files 201 from one or more sources, such as SOURCE A-SOURCE C. The data include information that can be represented as individually accessible records of data. The data can be part of a data cube that has one or more dimensions (e.g., categories of data, or attributes of data). For example, each dimension can correspond to a field of the data records. At least some of the data records each include respective data values for each of the dimensions.

In an example, a data repository may receive data from one or more communications networks representing logistical or commercial data, e.g., individual transactions from various retail companies. At least some of the transactions include data values for the dimensions. The dimensions may include a customer's CustomerStatus, Gender, State, City, and ZIP code, among others. A record processing module 202 ensures that the data is formatted according to a predetermined record format so that the values associated with a transaction are stored in a record. In some cases this may include transforming the data from the sources into the record format. In other cases, one or more sources may provide the data already formatted according to the record format.

The record processing module 202 prepares records for storage in various types of data structures depending on various factors such as whether it may be necessary to access the stored records quickly. When preparing records for compressed storage in a compressed record file, the processing module 202 sorts the records by a primary key value that identifies each record and divides the records into sets of records that correspond to non-overlapping ranges of primary key values. For example, each set of records may correspond to a predetermined number of records (e.g., one hundred records).

When managing an ICFF, the file management module 204 compresses each set of records into a compressed block of data. These compressed blocks are stored in a volume of the ICFF, which is stored in a record storage 206 (e.g., in a non-volatile storage medium such as one or more hard disk drives).

The system 200 also includes an indexing and search module 208 that provides an index that includes an entry for each of the blocks in the ICFF. The index is used to locate a block that may include a given record, as described in more detail below. The index can be stored in an index file in an index storage 210. For example, while the index file can be stored in the same storage medium as the compressed record file, the index file may also be stored in a relatively faster memory (e.g., a volatile storage medium such as a Dynamic Random Access Memory) since the index file is typically much smaller than the compressed record file.

An interface module 212 provides access to the stored records to human and/or computer agents, such as AGENT A-AGENT D. For example, the interface module 212 can implement an online account system for credit card customers to monitor their transactions. A request for transaction information meeting various criteria can be processed by the system 200 and corresponding records can be retrieved from within compressed blocks stored in the record storage 206.

A stream of incoming records from one or more sources may be temporarily stored before being processed to generate a compressed record file.

Figure 3:
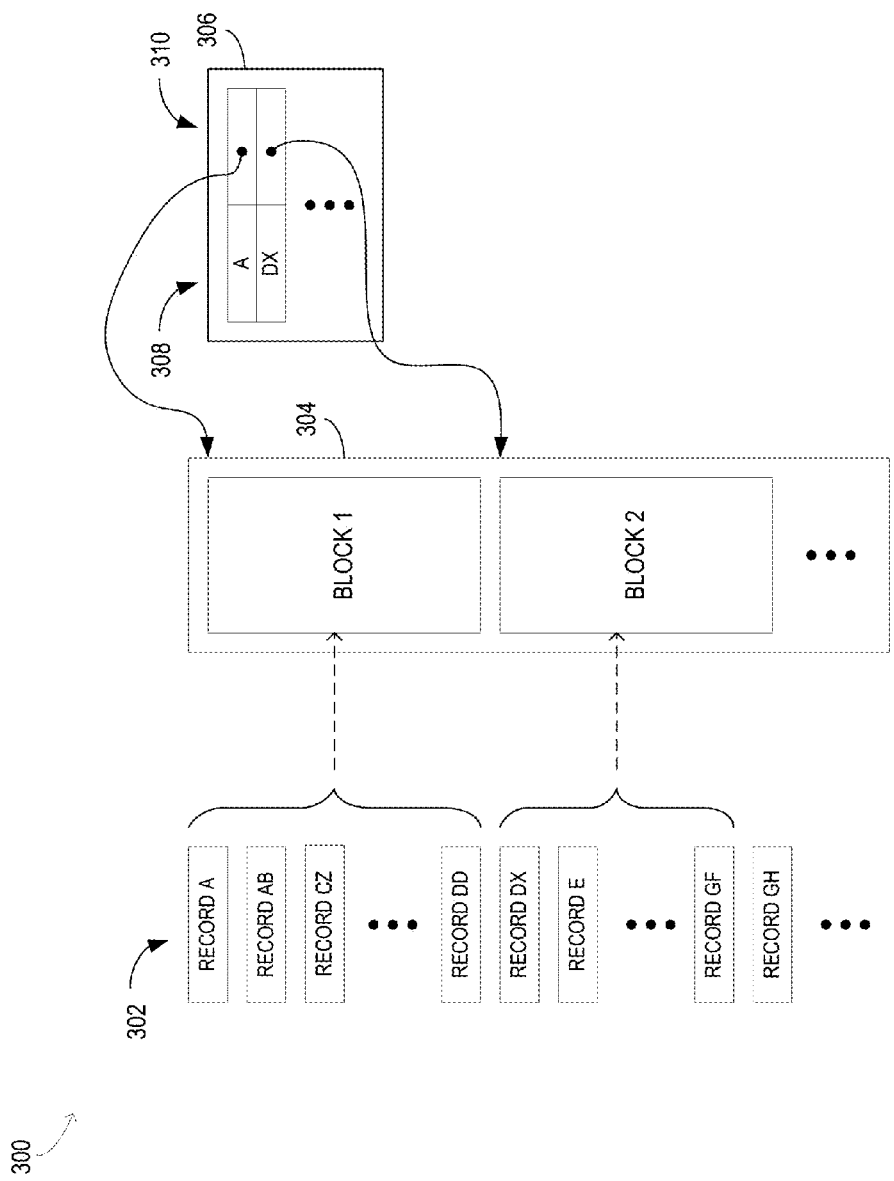
FIG. 3 shows an example of managing records in an index compressed flat file (ICFF) stored by the system of FIG. 2.

FIG. 3 shows an example of managing records in the ICFF. The system 200 receives records 302 to be stored in a volume 300 of the ICFF. The records may be sorted according to values of a primary key, which can uniquely identify a given record in the record storage 206, as described in more detail below. In some examples, the records 302 are stored in one or more flat files.

In the example shown in FIG. 3, the records 302 are identified by primary key values: A, AB, CZ, DD, etc. In this example, for simplicity, the records are sorted alphabetically according to their relatively simple (e.g., simple text string) primary key values, but the primary key values in the examples later in this description have primary key values of greater complexity. The system 200 can compress a first set of N records having primary key values A-DD to generate a corresponding compressed block labeled BLOCK 1. The next set of records can include the next N of the sorted records having primary key values DX-GF. The file management module 204 can use any of a variety of lossless data compression algorithms (e.g., Lempel-Ziv type algorithms). Each successive compressed block is combined to form a compressed record file 304 (e.g., a flat file, such as one of the flat files 122a-c shown in FIG. 1D).

The ICFF volume 300 also includes an index file 306. The indexing and search module 208 generates an entry in the index file 306 for each of the compressed blocks (e.g., BLOCK 1, BLOCK 2, etc.). The index entries include a primary key field 308 that identifies each compressed block, for example, by the primary key of the first record in the corresponding uncompressed set of records. The entries also include a location field 310 that identifies the storage location of the identified compressed block within the compressed record file 304. For example, the location field can contain a pointer in the form of an absolute address in the record storage 206, or in the form of an offset from the address of the beginning of the compressed record file 304 in the record storage 206. To search for a given record in the compressed record file 304, the module 208 can perform a search of the index file 306 based on the primary key field 308, as described in more detail below.

The ICFF can include multiple volumes (e.g., multiple ICFF volumes 300 of FIG. 3). Each ICFF volume includes at least one compressed record file (e.g., a flat file) and an index file (which, in some examples, may also be a flat file). For example, if records are received by the system 200 after the initial compressed record file 304 has been generated, a new ICFF volume can be created that includes its own compressed record file and index file. In some implementations, the new compressed record file can be appended to the initial compressed record file 304 to form a compound compressed record file, and the new index file can be appended to the initial index file 306 to form a compound index file. Any number of compressed record files can be appended to form a compound compressed record file. If the indexing and search module 208 is searching for a record with a given primary key value within a compound compressed record file, the module 208 searches for the record within each of the appended compressed record files using the corresponding index files. Alternatively, an agent requesting a given record can specify some number of the compressed record files with a compound compressed record file to be searched (e.g., the 10 most recently generated, or any generated within the last hour).

Still referring to FIG. 3, data can be loaded into the data cube in batches at intervals of time (e.g., once a day, once every hour, etc.). Each batch of data includes one or more records 302. When a batch is loaded, it is assigned a RunID, which is a value that identifies the particular batch loaded at a given time. All records in the batch are assigned the same RunID. A single time/date stamp is associated with each RunID. In some implementations, the RunID is a numerical value (e.g., an integer value).

Information related to each load operation is stored in a Load Catalog that is also stored on the ICFF. The Load Catalog includes a record of each load operation. Each time a batch of data is loaded into the data cube, a record that corresponds to the particular load operation is created in the Load Catalog. Each record in the Load Catalog includes the RunID associated with the load operation, a time/date stamp for the load operation, and identifiers (e.g., file names) of the particular ICFF volume where the loaded data resides. While other schemes are supported, ICFF volumes are typically segregated by day. The records can also include diagnostic statistics concerning the load operation. The Load Catalog can be used to request data when it is unknown exactly when the data was loaded. For example, a user who wishes to request the "latest" data can access the Load Catalog to determine where the latest data resides.

In some implementations, data records in the loaded data are sorted and/or grouped before they are written to the ICFF. For example, data records may be sorted and/or grouped according to the primary key, and the data records can be stored in the ICFF in their sorted and/or grouped form. FIG. 4 shows an example data record 400 as it may appear in the ICFF. The data record 400 includes values for a record identifier field, a RunID field, a DetailMask field, a CustomerStatus field, a Gender field, a State field, a City field, a ZIP code field, and a Primary Key field.

The primary key includes two fixed fields—RunID and DetailMask—followed by a field for each dimension. With reference to the example described above with respect to FIG. 1A and FIG. 4, a primary key specification for the data cube is: {RunID, DetailMask, CustomerStatus, Gender, State, City, ZIP Code}, and the primary key for the data record 400 is {1, 0AC, 0, 101, 201, 302, 404}. Thus, the loaded data records are sorted first by RunID, then by DetailMask, then by CustomerStatus, then by Gender, then by State, then by City, and finally by ZIP Code, as described in detail below. In some implementations, the loaded data is ordered appropriately and thus does not need to be sorted before it is written to the ICFF volume. For example, the original data may have been generated in an appropriate order before being prepared to be written to the ICFF volume.

RunID—Because the RunID is associated with a time/date stamp, the records are initially sorted chronologically based on when the records were loaded.

DetailMask—In general, the detail mask is a representation of the detail levels for the hierarchies in a given record. In some implementations, the detail mask is a single scalar value that encodes information about multiple detail levels. In this way, the detail mask can be stored in a manner that does not use a more complex data structure such as a vector. In some examples, the detail mask consists of a fixed-length string with one character for each hierarchy. Continuing with the example shown in FIG. 1A, an example data cube has three hierarchies: CustomerStatus (one dimension), Gender (one dimension), and Location (three dimensions—State, City, and ZIP code). The first character in the detail mask specifies the detail level for CustomerStatus, the second character specifies the detail level for Gender, and the third character specifies the detail level for Location. If a given detail level is 0, then no detail is present for that dimension in the record. For example, the detail mask '000' indicates that no detail is present for any dimension in the three hierarchies.

In the example detail mask shown here, uppercase alphabetic characters are used to indicate all other detail levels. The letter A indicates that level 1 detail is present for a given dimension. For example, the detail mask A0B indicates that there is detail for CustomerStatus and Location down to the City (second) level. In the associated record we would expect the CustomerStatus, State, and City fields to be populated and all other dimension fields would be unpopulated. In some implementations, measure fields are always populated. In another example, the detail mask 0AC indicates that there is detail for Gender, State, City, and Zipcode.

The order of the dimension fields in the primary key specification is based on each field's cardinality (e.g., the number of possible values for the field). For example, CustomerStatus has three possible values: "Inactive," "Active," and "Preferred." Gender also has three possible values: "Male," "Female," and "Unspecified." Thus, these two dimensions appear first in the primary key specification, followed by State (approximately fifty possible values), City (greater than fifty possible values), and ZIP code (greater than the number of possible values for City).

FIGS. 5A-C show an example of a table 500 representing a batch of sample data records that are sorted according to the primary key specification {RunID, DetailMask, CustomerStatus, Gender, State, City, ZIP Code}. In this example, measure fields are not shown, but typically would be included in a real-world implementation of this kind of table. The table 500 shows natural values with their associated surrogate ID (e.g., a numeric code) in parenthesis. A surrogate ID is a placeholder value used in an ICFF data file in order to reduce the amount of data stored in the file. For example, a numeric code requires less data to store than a text string, so the text string can be stored once in a separate location and cross-referenced to the numeric code. In some implementations, the data cube stores the surrogate IDs, and an external mechanism (e.g., a mapping file) handles mapping between natural values and surrogate ID. In some implementations, the surrogate IDs determine the ordering of values for purposes of sorting the data records.

The records are ordered such that data records with the same RunID are grouped together. In some implementations, all records with the same RunID (e.g., records that are part of the same batch) are stored in the same ICFF volume. In some implementations, all records stored in a particular ICFF volume all have the same RunID. In this way, the RunID is largely used as a way of grouping records into various ICFF volumes (e.g., as opposed to the RunID being used to sort the records within a particular ICFF volume). Because a single time/date stamp is associated with each RunID, in some implementations, all of the records in a particular ICFF volume can be associated with the same time/date stamp.

The sorting technique described above enables all records in a particular ICFF volume to be sorted chronologically based on the time/date that the record was loaded. In this way, a query that is based on a time/date range when the record was loaded will likely need to access a minimal number of ICFF volumes to return the query results, thereby minimizing the number of blocks and/or volumes that need to be read.

Each group of records may be grouped into subsets according to the detail mask. The subsets can be arranged according to the detail mask and a sorting criterion. In some implementations, the sorting criterion causes records with smaller detail mask (e.g., detail mask with lower alphanumeric values, indicating that less detail is provided) to be ordered ahead of records with larger detail mask (e.g., detail mask with higher alphanumeric values, indicating that greater detail is provided).

The records in each subset (e.g., records having the same detail mask) can be ordered according to data values of the various dimensions of the data record. For example, the records may be grouped into sub-groups according to data values of a first dimension (e.g., the CustomerStatus dimension). The sub-groups are then arranged according to the data values of the first dimension and according to a sorting criterion. In some implementations, the sorting criterion causes records with smaller numerical data values for the dimension to be ordered ahead of (e.g., above) records with larger numerical data values for the dimension.

As mentioned above, the dimensions are ordered in the primary key specification based on each dimension's cardinality. Thus, the CustomerStatus dimension has the same number or a smaller number of possible data values than the number of possible data values for a second dimension (e.g., the Gender dimension). In this example, the CustomerStatus dimension and the Gender dimension each have three possible data values.

For the purpose of explaining how the records in each subset are ordered, we refer to FIG. 5C, which shows records that occur further down in the table 500. The records shown in FIG. 5C are especially useful for illustrating how the records are ordered because they relate to records that have the highest level detail mask that is possible for the data of the data cube. In particular, Record #208-237 have a value of the DetailMask field of "AAC," which indicates that the records include data values for each dimension.

The data records shown in FIG. 5C are grouped into two sub-groups: a first sub-group that includes Record #208-234, and a second sub-group that includes Record #235-237. The records in the first sub-group have a data value of "1" for the CustomerStatus dimension, and the records in the second sub-group have a data value of "2" for the CustomerStatus dimension. Although only two sub-groups are shown and described here, additional records and additional sub-groups exist. For example, a third sub-group that includes records having a data value of "3" for the CustomerStatus dimension exists.

The sub-groups are arranged according to the data values of the CustomerStatus dimension. In some implementations, the sub-groups are ordered such that sub-groups with smaller numerical data values for the CustomerStatus dimension are ordered ahead of sub-groups with larger numerical data values for the CustomerStatus dimension. In this example, the first sub-group is arranged ahead of the second sub-group.

The data records of each sub-group are arranged according to data values of the Gender dimension, such that data records of each respective sub-group are sorted by the values of the Gender dimension. For example, Record #208-216 have a data value of "101" for the Gender dimension, Record #217-225 have a data value of "102" for the Gender dimension, and Record #226-234 have a data value of "103" for the Gender dimension. In some implementations, the data records are ordered such that data records of each respective sub-group with smaller numerical data values for the Gender dimension are ordered ahead of data records of the respective sub-group with larger numerical data values for the Gender dimension. In this example, Record #208-216 are ordered ahead of Record #217-225, which are ordered ahead of Record #226-234.

The data records are further ordered/sorted according to the data values of the remaining dimensions in a fashion similar to that described above. For example, Record #208-216, Record #217-225, and Record #226-234 can each represent a sub-sub-group (e.g., a subset of a sub-group, or a "second order" sub-group) of the data records, and the data records of each sub-sub-group can be arranged according to data values of the subsequent dimension. Taking the first sub-sub-group that includes Record #208-216 as an example, the records are arranged according to data values of the State dimension, creating three sub-sub-sub-groups of data records. Each of these sub-sub-sub-groups of data records can be further arranged according to data values of the City dimension, and the records in the resulting subsets (e.g., sub-sub-sub-sub-groups) can be further arranged according to data values of the ZIP code dimension. The records of the other sub-groups (and sub-sub-groups and sub-sub-sub-groups) are similarly ordered in this hierarchical fashion.

FIG. 6 shows an example of a census 600. As will be described in greater detail below, a census can be used to modify a query that has a constraint on one dimension in a hierarchy by adding additional constraints in that hierarchy.

Each time a batch of data is loaded to the ICFF, relational data can be stored in a census. The census is also stored in the ICFF. In some implementations, the census is stored in an ICFF volume separate from the files containing the data of the data cube. The census stores related values for dimensions in hierarchies whose level is greater than 1. In this example, the Location hierarchy includes the State dimension (level 1), the City dimension (level 2), and the ZIP code dimension (level 3). Thus, the census stores related values for City dimension values and ZIP code dimension values.

When a query includes a constraint on the City dimension, the census 600 can be used to determine a corresponding value for the State dimension. Similarly, when a record includes a constraint on the ZIP code dimension, the census 600 can be used to determine the corresponding values for the City dimension and the State dimension. The corresponding values can be added to the query as additional constraints. For example, a query may request "For customers in Boston, how many purchases were made, broken down by gender?" In this example, the record storage and retrieval system 200 can access the census 600 which states that when a record has the value "Boston" (or, e.g., a surrogate ID (303) that corresponds to "Boston") in a City dimension field, the State dimension field should have the value "Massachusetts" (or, e.g., a surrogate ID (202) that corresponds to "Massachusetts"). The system 200 may modify the query to include additional constraints, e.g., "For customers in Boston, Mass., how many purchases were made, broken down by gender?" Similarly, the census states that when a query has a particular constraint on a ZIP code dimension field, the City dimension field and the State dimension field should have values that correspond to the city and state that corresponds to the ZIP code. In this way, queries can be supplemented with additional information that allows for more robust querying. Such information can be especially useful when a query is processed according to an iterative optimization method, as described in more detail below.

Querying the Data Cube

The data cube can be queried to return records that are stored in the data cube. The query is based on a query algorithm that uses a SQL query as input. For example, the input query may be as follows:

---

SELECT gender, state, city FROM cube WHERE state='MA' AND timestring IS BETWEEN '8/1/2015' AND '11/1/2015'

---

This query can be expressed in "plain English" as "In the last three months, how many purchases were made in cities in Massachusetts, broken down by gender?"

The query is processed by a query algorithm in order to query the data cube called "cube." An example of the query algorithm is shown below:

---

Parse the input query
Determine the output detail mask based on the query
Get the list of RunIDs needed to satisfy the query
Iterate over RunIDs...
    Open the appropriate ICFF volume
        Iterate over normalized constraints (cross product)...
        If the iterative optimizer is appropriate for this query
            Process the query using the iterative optimizer
        Otherwise
            Process the query using the standard method

---

The query is first parsed. The parsing includes identifying time/date boundaries (if any) and identifying dimensional constraints. When the query is parsed, a time/date boundary of Aug. 1, 2015 to Nov. 1, 2015 is identified, indicating that only records that were created in that range should be included in the result set. The dimensional constraint State='MA' is also identified.

In some implementations, the parsing also includes determining whether the query is a candidate for iterative optimization, but that will be described in more detail below.

The output detail mask is then computed based on an evaluation of the input parameters, including detail level, such that records that are considered for inclusion in the result set contain the output detail mask. As mentioned above, the detail mask specifies the detail level for each of the hierarchies—CustomerStatus, Gender, and Location. The query "In the last three months, how many purchases were made in Massachusetts, broken down by gender?" does not require any CustomerStatus information, so the detail level for the CustomerStatus hierarchy is 0. The query requires Gender information, so the detail level for the Gender hierarchy is 1 (e.g., the highest level of detail available for the Gender hierarchy). The query also requires Location information—specifically, the query requires State information and City information. Thus, the detail level for the Location hierarchy is 2. Because ZIP code information is not relevant to this query, a Location detail level of 3 is unnecessary (and, e.g., would waste system resources for the current purpose if it were used to process the query). The output detail mask for this query would thus be 0AB.

Because the detail mask occurs relatively early in the primary key used for sorting records (e.g., second only to RunID), the querying algorithm can quickly narrow its focus to this particular range of contiguous records in the ICFF data file. For example, referring briefly to FIGS. 5A-C, all records with a detail mask of 0AB (e.g., Record #20-27) are grouped together. However, it should be noted that the records shown in FIGS. 5A-C all correspond to the same RunID (and, e.g., the same time/date stamp). Other RunIDs that correspond to dates/times that fit within the query timeframe may exist, and records that include those RunIDs may also need to be analyzed.

Once the output detail mask is computed, the record storage and retrieval system 200 obtains a list of RunIDs that are needed to satisfy the query. That is, the system 200 identifies RunIDs that correspond to dates/times that occur during the timeframe specified by the query (e.g., 1:00 PM on Apr. 4, 2015 to 1:00 PM on Jul. 4, 2015). As mentioned above, each time a batch of data is loaded into the data cube, a record that corresponds to the particular load operation is created in the Load Catalog. Each record in the Load Catalog includes the RunID associated with the load operation, a time/date stamp for the load operation, and identifiers (e.g., file names) of the particular ICFF volume where the loaded data resides. Thus, the system 200 can access the Load Catalog to identify which ICFF volumes include data that has a time stamp that satisfies the query. Further, because the RunID is the first element of the primary key used for sorting records, the querying algorithm can quickly narrow its focus to a particular range of contiguous records in the ICFF data file (e.g., and even across multiple volumes of the ICFF data file).

Because each batch of data loaded into the data cube may reside in different files (e.g., different ICFF volumes), the query is executed for each batch (e.g., RunID) separately. The following iterative process is performed for each of the one or more identified RunIDs.

Using the ICFF volume file name that was identified using the Load Catalog, the ICFF volume that corresponds to the particular RunID is opened.

The query is executed iteratively over a set of normalized constraints related to the query (e.g., as a cross product), as explained in further detail below. In this example, the only dimensional constraint is State=[MA]. In other words, the results should only include records that have a value of MA for the State dimension; the particular values for the other dimensions are irrelevant for purposes of determining which records satisfy the query. There is also a timeframe constraint, but that has already been accounted for by identifying the list of RunIDs and subsequently identifying the ICFF volume file names that were identified using the Load Catalog.

Because State=[MA] is the only dimensional constraint for this query, only one iteration of the query is required. However, suppose the query was instead "In the last three months, how many purchases were made by males in cities in Massachusetts, Conn., or New York." In such an example, the dimensional constraints would be State=[MA, CT, NY]; Gender=[Male]. To satisfy this query, a cross product of all constraints can be executed. A cross product of constraints is a result of a query that is executed using multiple iterations of sub-queries. For example, the first iteration of the query would include the constraints State=[MA] and Gender=[Male]; the second iteration of the query would include the constraints State=[CT] and Gender=[Male]; and the third iteration of the query would include the constraints State=[NY] and Gender=[Male]. The cross product of all constraints is referred to as a set of normalized constraints.

The form of the query and the way in which the query is processed depends on whether the query is a candidate for iterative optimization. Iterative optimization is described in detail below, and in fact, the query in the original example ("In the last three months, how many purchases were made in Massachusetts, broken down by gender?") is a candidate for iterative optimization, but for now, we will describe processing of this query according to the standard method.

Standard Method

Using the computer output detail mask and constraints, a lookup_range statement is computed. Lookup_range is a function that takes the following input parameters: lookup_id; a set of minimum primary key values; and a set of maximum primary key values. The lookup_id is a reference to a lookup resource (e.g., the particular ICFF volume). The minimum and maximum primary key values refer to values in the fields defined in the primary key specification. In this example, the primary key specification is {RunID, DetailMask, CustomerStatus, Gender, State, City, ZIP Code}. One minimum value and one maximum value is specified for each field. The lookup_range function returns the set of records where the first record in the ICFF volume whose primary key is greater than or equal to the minimum primary key values specified, and the last record in the ICFF volume whose primary key is less than or equal to the maximum primary key values specified.

The minimum and maximum values for RunID are identical because data is gathered for each RunID separately (e.g., as part of the iterative process). For example, the minimum and maximum values for RunID would be "1" for the first iteration. Also, because a single query specifies a single detail mask, the minimum and maximum values for the DetailMask are also identical (e.g., "0AB").

For each dimension, the minimum and maximum values are determined according to the following algorithm:

```
If there is a constraint for this dimension then
    minval = value of the constraint
    maxval = value of the constraint
else if detail is included in the detail mask for this dimension then
    minval = 0
    maxval = MAX_ID (a large numeric integer)
else
    minval = 0
    maxval = 0
```

The query "In the last three months, how many purchases were made in Massachusetts, broken down by gender?" requires only one dimensional constraint: State=[MA]. Thus, the minval and the maxval for the State dimension are identical and have a value of "202," which is the surrogate ID that corresponds to MA (as described above with reference to FIGS. 5A-C).

Although State=[MA] is the only dimensional constraint, the query requires detail for the Gender dimension and the City dimension. Thus, the minval and the maxval are "0" and "999999999," respectively, for both the Gender dimension and the City dimension.

The query does not require detail for the CustomerStatus dimension nor the ZIP code dimension. Thus, the minval and the maxval for the CustomerStatus dimension and the ZIP code dimension are "0."

The computed lookup_range statement would be as follows:

```
lookup_range(cube_lookup_id,
    1,'0AB',0,0          ,202,0       ,0,   //min key values
    1,'0AB',0,999999999,202,999999999,0     //max key values
)
```

When executed, this lookup_range statement will find the first record whose primary key is greater than or equal to the specified minimum primary key values, and the last record whose primary key is less than or equal to the specified maximum primary key values. The first record, the last record, and all intervening records satisfy the query and will be included in the result set.

Referring to the sample data shown in FIGS. 5A-C, this call to the lookup_range function would return Record #22 as the first record and Record #25 as the last record. Record #22-25 would be included in the set of records returned by the lookup_range function. However, Record #23 and Record #24 do not satisfy the query because they do not satisfy the constraint State=[MA]. Thus, data processing overhead was wasted fetching these two extra records that do not satisfy the query. While these records can be filtered out of the result set before the result set is returned, the filtering also requires extra data processing overhead. In this example, the extra overhead involved in fetching these two extra records is insignificant, but in a larger scale example, fetching many unneeded records can have a significant negative impact on system performance. To avoid unnecessary data processing overhead, some qualifying queries can be processed according to the Iterative Optimization Method. As mentioned above, the query presented in this example, "In the last three months, how many purchases were made in Massachusetts, broken down by gender?," qualifies for iterative optimization.

Iterative Optimization Method

The record storage and retrieval system 200 determines whether the query qualifies for iterative optimization when the query is parsed. A query is a candidate for iterative optimization if it requires detail for an unconstrained dimension whose position in the primary key occurs to the left (e.g., it has a lower cardinality) of a constrained dimension. The query "In the last three months, how many purchases were made in Massachusetts, broken down by gender?" from the previous example requires detail for the Gender dimension, the State dimension, and the City dimension. Amongst these three dimensions, only the State dimension is constrained (e.g., State=[MA]). The Gender dimension and the City dimension are unconstrained. The query does not require detail for the CustomerStatus dimension nor the ZIP code dimension. Thus, the DetailMask is "0AB."

The query qualifies for iterative optimization because: i) the query requires detail for the Gender dimension, which is an unconstrained dimension; iii) the Gender dimension (represented by the "A") occurs in the primary key to the left of the State dimension of the Location hierarchy (represented by the "B").

The iterative optimization method involves formulating multiple lookup_range calls to fetch only those records that satisfy all constraints, thus minimizing overfetch. For example, a lookup_range call can be formulated and processed for each distinct value for the Gender dimension—Female (101), Male (102), and Unspecified (103). The lookup_range calls would be as follows:

```
//Gender = Female
lookup_range(cube_lookup_id,
    1,'0AB',0,101,202,0          ,0,   //min key values
    1,'0AB',0,101,202,999999999,0      //max key values
)
//Gender = Male
lookup_range(cube_lookup_id,
    1,'0AB',0,102,202,0          ,0,   //min key values
    1,'0AB',0,102,202,999999999,0      //max key values
)
//Gender = Unspecified
lookup_range(cube_lookup_id,
    1,'0AB',0,103,202,0          ,0,   //min key values
    1,'0AB',0,103,202,999999999,0      //max key values
)
```

The results of each lookup_range call are concatenated such that the result set includes only the records called for in the query without any intervening, non-matching records.

Because each possible value for the Gender dimension is known, it is possible to easily formulate the three lookup_range calls, each with one of the three possible values. However, in some examples, all distinct values for a dimension may be unknown to the system.

In some implementations, all distinct values for a particular dimension can be obtained by formulating and processing a lookup_range call. For example, referring again to FIGS. 5A-C, Record #12-14 include the three distinct values for the Gender dimension. The following lookup_range call would return all records that include distinct values for the Gender dimension (e.g., Record #12-14):

```
iteration_record =
lookup_range(cube_lookup_id,
    1,'0A0', 0,0          ,0,0,0,   //min key values
    1,'0A0', 0,999999999,0,0,0,     //max key values
)
```

The system can determine each distinct value for the Gender dimension from each of the returned records by calling the variable iteration_record.Gender to retrieve the value of the "Gender" field from the "iteration_record" record.

The following simplified algorithm includes the lookup_range call provided above (e.g., for determining all distinct values for the Gender dimension) as well as a second lookup_range call that is part of a while loop. The second lookup_range call receives one of the distinct values for the Gender dimension at each iteration and determines a set of results that satisfy the query. The results of each iteration of the lookup_range call are concatenated such that the complete result set includes only the records called for in the query without any intervening, non-matching records. In this way, the second lookup_range call executes in a similar fashion as the three distinct lookup_range calls provided above while supporting references to the various distinct values for the Gender dimension (which, e.g., may be unknown to the system). The simplified algorithm is as follows:

```
iteration_records =
lookup_range(cube_lookup_id,
      1,'0A0', 0,0           ,0,0,0,   //min key values
      1,'0A0', 0,999999999,0,0,0,      //max key values
)
for each (iteration_record in interation_records) //repeat until no more
    records
    output_records =
       lookup_range(cube_lookup_id,
          1,'0AB',0,                             //min key values
          iteration_record.Gender,202,0        ,0,
          1,'0AB',0,                             //max key values
          iteration_record.Gender,202,999999999,0
       )
    for each (output_record in output_records) //repeat until no more
       records
       process(output_record); //this is a matching record
    end //while
end //while
```

In some implementations, further iterative optimization is possible. For example, additional optimization may be applied when the query requires detail for multiple unconstrained dimensions that occur to the left of a constrained dimension in the primary key. Consider the query "Show me records for customers in Boston organized by gender." Like the query of the previous example, this query requires detail for the Gender dimension, the State dimension, and the City dimension. However, in this example, the City dimension is constrained (e.g., City=[Boston]), and the Gender dimension and the State dimension are unconstrained. The query does not require detail for the CustomerStatus dimension nor the ZIP code dimension. Thus, the DetailMask is "0AB."

Because one of the unconstrained dimensions (e.g., the State dimension) and the constrained dimension (e.g., the City dimension) both belong to the Location hierarchy, the position of the hierarchies in the detail mask cannot be used to determine whether the query qualifies for iterative optimization. Instead, the level of detail of these two dimensions is used to determine whether the unconstrained dimension occurs to the left of the constrained dimension. Dimensions that have lower detail levels occur to the left of dimensions that have higher detail levels. Thus, in this example, the State dimension occurs to the left of the City dimension.

The query qualifies for further iterative optimization because: i) the query requires detail for multiple unconstrained dimensions—the Gender dimension and the State dimension; ii) the Gender dimension belongs to the Gender hierarchy and the State dimension belongs to the Location hierarchy; iii) the Gender hierarchy (represented by the "A") occurs to the left of the Location hierarchy (represented by the "B"); iv) the State dimension has a lower detail level (e.g., level 1) than the City dimension (e.g., level 2); and v) the City dimension is a constrained dimension.

To return a complete set of results, the algorithm needs to determine all possible distinct values for Gender and State. This is done by the first lookup_range call (e.g., the "outer" lookup_range call, sometimes referred to as the iteration lookup_range call). The algorithm then iterates over each possible pair of distinct values to return a complete set of results that satisfy the query (e.g., a set of records that each has a value of "302" for the City dimension, where "302" is the surrogate ID that corresponds to Boston). This is done by the second lookup_range call (e.g., the "inner" lookup_range call, sometimes referred to as the output lookup_range call). The algorithm for this example is as follows:

```
iteration_record =
   // Iterate over all distinct values for Gender [101,102,103]
   //     and State [201,202,203]
   // this is the "outer" lookup_range
   lookup_range(cube_lookup_id,
      1,'0AA', 0,0              ,0          ,0,0,   //min key values
      1,'0AA', 0,9999999999,9999999999,0,0           //max key values
   )
while (iteration_record is valid) //repeat until no more records
   output_record =
      // this is the "inner" lookup_range
      lookup_range(cube_lookup_id,
         1,'0AB', 0,iteration_record.Gender,iteration_record.State,303,
         0, //min key values
         1,'0AB', 0,iteration_record.Gender,iteration_record.State,303,
         0  //max key values
      )
   while (output_record is valid) //repeat until no more records
      process(output_record); //this is a matching record
   end //while
end //while
```

This algorithm iterates over all combinations of Gender and State and performs the inner lookup_range for each iteration. Nine iterations are performed in total because there are three distinct values for the State dimension (CA, MA, NY) and three distinct values for the Gender dimension (Female, Male, Unspecified). However, only three of these iterations actually return records that satisfy the query because the City specified in the constraint (Boston (303)) only occurs in one State: MA (202). If this information were available to the system ahead of time, the six other iterations could be avoided by adding a constraint for State=[202] and eliminating the State dimension from the outer lookup_range function, thereby reducing the number of calls to the inner lookup_range function. Such an algorithm would be as follows:

```
iteration_record =
   // Iterate over all distinct values for Gender [101,102,103]
   lookup_range(cube_lookup_id,
      1,'0A0', 0,0           ,0,0,0,   //min key values
      1,'0A0', 0,9999999999,0,0,0      //max key values
   )
while (iteration_record is valid) //repeat until no more records
   output_record =
      lookup_range(cube_lookup_id,
         1,'0AB', 0,iteration_record.Gender,202,303,0, //min key values
         1,'0AB', 0,iteration_record.Gender,202,303,0  //max key values
      )
   while (output_record is valid) //repeat until no more records
      process(output_record); //this is a matching record
   end //while
end //while
```

In order to form this further-optimized query, the system must have access to relational information that tells the system that Boston (303) only occurs in MA (202). As described above, such relational data is stored in the census. Briefly referring to FIG. 6, the census 600 includes an entry that specifies that when the City dimension has a value of Boston (303), the State dimension should have a value of MA (202). When the system is formulating the algorithm, the system can access the census 600 to determine that City dimension values of 303 are always accompanied by State dimension values of 202. The system can then modify the algorithm accordingly for further optimization. This technique is sometimes referred to as "hydrating" (or "inferring") constraints, or more specifically, hydrating constraints on higher level dimensions in the same hierarchy.

Constraints can be hydrated regardless of the depth of the related dimension in the hierarchy. For example, briefly referring to FIGS. 5A-C and FIG. 6, if the query were "Show me records for customers in ZIP code 94609 organized by gender," constraints for the City dimension (Berkeley (301)) and the State dimension (CA (201)) would be hydrated. The system would look to the census 600 to determine this relational information.

A query can also be optimized if it contains multiple unconstrained dimensions. An example is the query "Show me records for customers in Boston, Mass. organized by zip code and gender." Here, the City and State dimensions are constrained and the ZIP code dimension and the gender dimension require detail and are unconstrained. Thus, the DetailMask is "0AC."

Because the unconstrained dimensions (e.g., the ZIP code and gender dimensions) do not belong to the same hierarchy, the position of the hierarchies in the detail mask can be used to determine whether the query qualifies for iterative optimization. Dimensions that have lower detail levels occur to the left of dimensions that have higher detail levels. Thus, in this example, the Gender dimension occurs to the left of the ZIP code dimension (e.g., a dimension of the Location hierarchy).

The query qualifies for further iterative optimization because: i) the query requires detail for multiple unconstrained dimensions—the Gender dimension and the ZIP code dimension; ii) the Gender dimension belongs to the Gender hierarchy and the ZIP code dimension belongs to the Location hierarchy; iii) the Gender hierarchy (represented by the "A") occurs to the left of the Location hierarchy (represented by the "C").

To return a complete set of results, an algorithm similar to the one described in the previous example can be used, e.g., the algorithm needs to determine all possible distinct values for Gender and ZIP Code. Instead of, for example, querying all values of Gender and ZIP Code and performing a cross product, another technique, for example, is to use a detail mask that includes those dimension and remove results that do not apply to the query.

The system may perform one or more pre-processing operations on the data that is loaded into the data cube to improve the efficiency of the query process. For example, various aggregates of data can be pre-computed as part of a data preparation and/or a data loading process (e.g., as or before the data is loaded into the data cube). The aggregates can be pre-computed according to various combinations of dimensional detail, or in many cases, for every combination of dimensional detail.

As mentioned above, data records produced for a particular query can include fields that are populated with measures that are relevant to the query. Measures are values that are aggregated at different levels of dimensional detail. For example, the query "How many purchases were made, per state, in 2014" would return records that have a NumberOfPurchases measure. The query may return the following records:

| State | NumberOfPurchases |
|-------|-------------------|
| CA    | 23,438            |
| NY    | 18,420            |
| MA    | 15,348            |

In another example, the query "How many purchases were made, per city, in 2014" may return the following records:

| State | City      | NumberOfPurchases |
|-------|-----------|-------------------|
| CA    | Berkeley  | 9,234             |
| NY    | New York  | 9,043             |
| MA    | Boston    | 7,438             |
| CA    | Hollywood | 4,372             |
| NY    | Albany    | 2,483             |

In yet another example, the query "How many purchases were made in each city, per gender, in 2014" may return the following records.

| State | City      | Gender | NumberOfPurchases |
|-------|-----------|--------|-------------------|
| CA    | Berkeley  | Male   | 4,849             |
|       |           | Female | 4,385             |
| NY    | New York  | Male   | 3,071             |
|       |           | Female | 5,972             |
| MA    | Boston    | Male   | 4,745             |
|       |           | Female | 2,693             |
| CA    | Hollywood | Male   | 2,221             |
|       |           | Female | 2,151             |
| NY    | Albany    | Male   | 793               |
|       |           | Female | 1,690             |

Before the query is received, the system does not know the level of detail that is going to be required to produce results that satisfy the query. Thus, the system can pre-compute aggregates for the various measures according to all combinations of dimensional detail. For example, the system can pre-compute the NumberOfPurchases measure for: all males broken down by state; all females broken down by state; all males who are active customers broken down by state; all females who are inactive customers broken down by ZIP code; all inactive customers broken down by gender; and all states broken down by customer status, just to name a few. Because the aggregates are pre-computed, the time and processing power required to answer the query at the time when the query is received can be significantly minimized.

While the foregoing examples describe data cubes that are stored in an ICFF, data cubes can also be stored in other types of files. For example, data cubes can be stored in files that contain records that have structural relationships (e.g., files stored in a relational database). However, many of the features described herein are particularly well suited in the context of ICFFs. Because data is not modified after it is written to an ICFF, data can be read from the ICFF without the use of a locking technique. Thus, data can be written to and read from an ICFF without setting locks, which otherwise takes time and processing power, or waiting for locks to be released, which otherwise increases latency. Because data is not modified after it is written to an ICFF, old data can be easily identified and discarded if the resources (e.g., storage space) used by the old data are needed for other purposes. Because data in an ICFF can be directly read from data files, the data in an ICFF can potentially be read from more quickly than techniques that require a read command to be executed by an intermediate system such as a relational database management system. Because data in an ICFF is typically compressed, the data may use less storage space than data stored using other techniques.

The sorting/grouping techniques described above ensure that all records in a particular ICFF volume are sorted chronologically based on the time/date that the record was loaded, making the lookup_range function an especially useful tool for querying. In this way, a query that is based on a time/date range when the record was loaded will likely need to access a minimal number of ICFF volumes to return the query results, thereby minimizing the number of blocks and/or volumes that need to be read.

The primary key specification is specifically designed to work well with an ICFF. The primary key is relatively wide, includes many fields, and has three major sections: i) RunID; ii) DetailMask; and iii) Dimensional attributes ordered from low to high cardinality. Because RunID is a proxy for date, the records are primarily sorted chronologically. Because most queries involve a particular time/date range, the primary key is well suited for querying an ICFF of chronological data while minimizing the number of input/output operations.

Data Processing Systems

Figure 7:
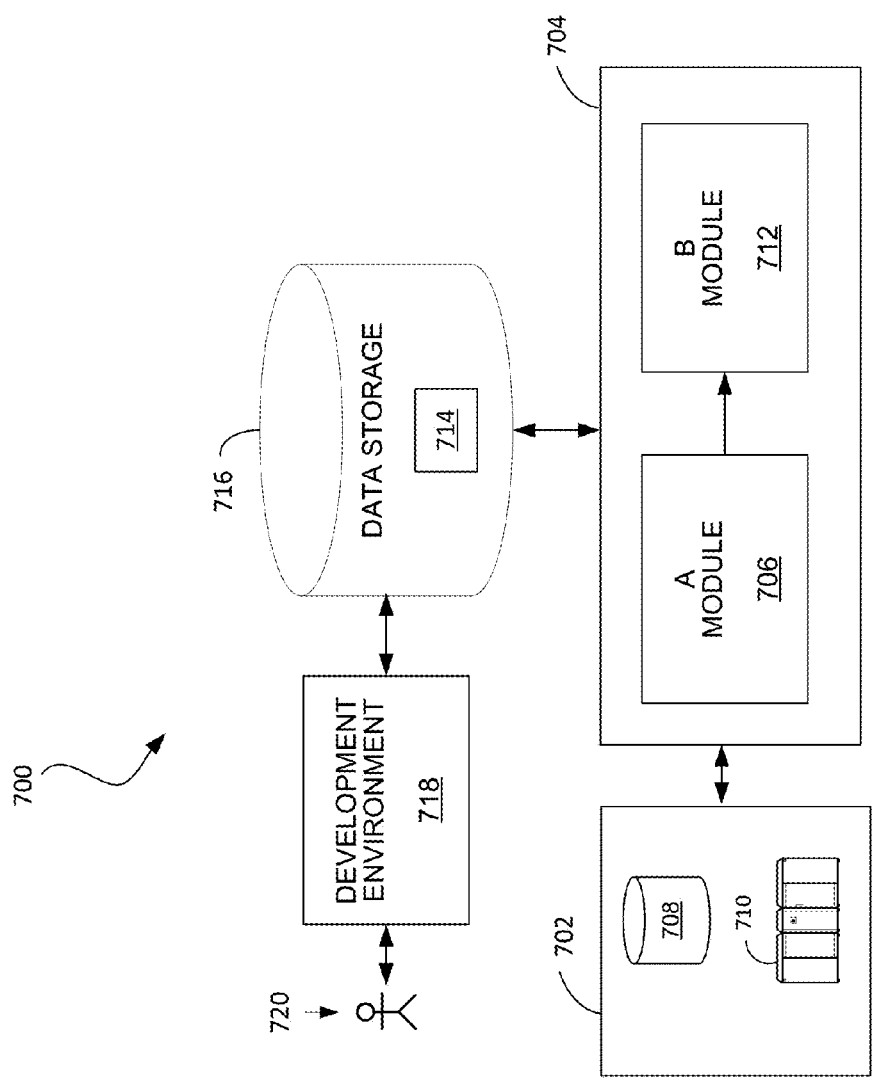
FIG. 7 shows an example of a data processing system.

FIG. 7 shows an example of a data processing system 700 in which the systems and techniques described herein can be used. The system 700 includes a data source 702 that may include one or more sources of data such as storage devices or connections to online data streams, each of which may store or provide data in any of a variety of formats (e.g., ICFFs, database tables, spreadsheet files, flat text files, or a native format used by a mainframe). An execution environment 704 includes a pre-processing module 706 and an execution module 712. The execution environment 704 may be hosted, for example, on one or more general-purpose computers under the control of a suitable operating system, such as a version of the UNIX operating system. For example, the execution environment 704 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The pre-processing module 706 reads data from the data source 702 and stores information related to pre-computed aggregates (e.g., measures). Storage devices providing the data source 702 may be local to the execution environment 704, for example, being stored on a storage medium connected to a computer hosting the execution environment 704 (e.g., hard drive 708), or may be remote to the execution environment 704, for example, being hosted on a remote system (e.g., mainframe 710) in communication with a computer hosting the execution environment 704, over a remote connection (e.g., provided by a cloud computing infrastructure).

The execution module 712 uses the pre-computed information generated by the pre-processing module 706 to process a query. The output data may be 714 stored back in the data source 702 or in a data storage system 716 accessible to the execution environment 704, or otherwise used. The data storage system 716 is also accessible to a development environment 718 in which a developer 720 is able to provide a query. The development environment 718 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 706 can receive data from a variety of types of systems that may embody the data source 702, including different forms of database systems. The data may be organized as records having values for respective fields (also called "dimensions," "attributes," or "columns"), including possibly null values. When first reading data from a data source, the pre-processing module 706 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

In some examples, the data processing system 700 can process a query (e.g., a query used to retrieve data from a data cube such as the data cube 100 shown in FIG. 1A) by generating a computer program, such as a dataflow graph, based on the query and executing the computer program. Such techniques are described in U.S. Publication No. 2011/0179014A1, titled "Managing Data Queries," and U.S. Publication No. 2012/0284255A1, also titled "Managing Data Queries," and U.S. application Ser. No. 14/752,094, titled "Querying a Data Source on a Network," all incorporated herein by reference.

Procedures for Data Storage and Retrieval

Figure 8:
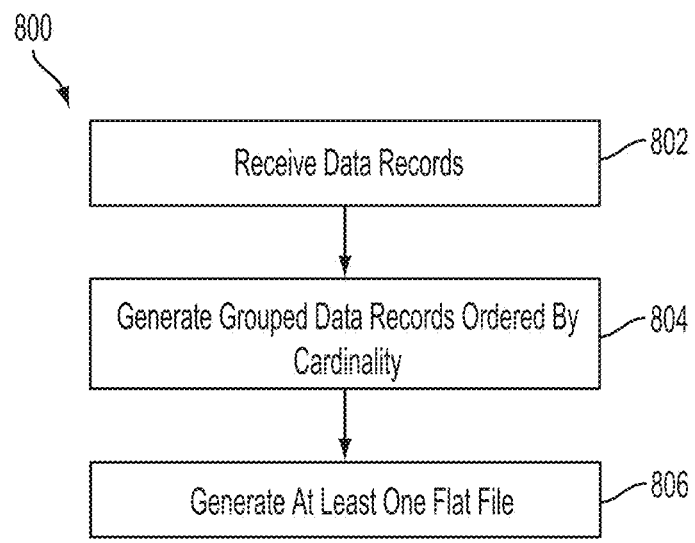
FIGS. 8 and 9 are flowcharts.

FIG. 8 shows a flowchart representing a procedure 800 for storing data of a data cube in storage other than a relational database, e.g., one or more flat files. The procedure 800 can be carried out, for example, by components of the record storage and retrieval system 200 shown in FIG. 2.

The procedure receives 802 a set of data records. The set of data records has at least two dimensions, and at least some of the data records each include respective data values for each of the at least two dimensions.

In some examples, the data includes one or more hierarchies. A hierarchy includes at least two dimensions, wherein one of the dimensions represents a first level of the hierarchy, and another of the dimensions represents a second level of the hierarchy below the first level.

The procedure generates 804 a set of grouped data records ordered by cardinality. This includes grouping the data records into subsets according to data values of a first dimension of the at least two dimensions, the first dimension having fewer possible data values than a number of possible data values for a second dimension. It also includes arranging the subsets of the grouped data records according to the data values of the first dimension and according to a sorting criterion. It further includes arranging the data records of the subsets of the grouped data records according to data values of the second dimension of the at least two dimensions, such that data records of each respective subset of the grouped data are sorted by the values of the second dimension.

Any particular data record of the grouped data records includes a primary key that can be used to identify data of a particular data record in response to a request. For example, the primary key may be made up of at least some of the data values of the particular data record, and the primary key may also include an element computed from at least one characteristic of at least two dimensions of the particular data record. The computed element could be a detail mask, which is a scalar representation of one or more detail levels of the dimensions. In some implementations, at least some of the grouped data records are sorted according to the detail mask. An example of data grouped in this way, including the detail mask, is shown in FIGS. 5A-5C.

The procedure generates 806 at least one flat file containing the set of grouped data records. The generated at least one flat file is then stored in non-transitory computer readable media.

In some examples, the grouped data records are stored in one or more flat files in the form of blocks. Each of these blocks includes one or more of the data records. Further, an index can be generated that includes one or more entries for each of the blocks. The entries for each of the blocks can include a primary key field that identifies the respective block and a location field that identifies a storage location of the respective block within the one or more flat files, e.g., which flat file, and which line of the flat file (in a flat file having lines separated by carriage returns or line breaks or another kind of line delimiter or one or more of these things). The index can be used to identify, based on a received primary key value and by using the primary key field and the location field, a storage location of one of the blocks that includes data records corresponding to a range of primary key values that includes the received primary key value. Examples of the blocks and index are described above with respect to FIG. 3.

The data stored by the procedure 800 can include pre-computed values. For example, the procedure can include pre-computing one or more values for different detail levels among the dimensions. In this example, the pre-computed values represent measures aggregated at different levels of dimensional detail, and the grouped data records include at least some of the pre-computed values.

Once the data is stored, the data can be retrieved, e.g., in response to a query such a SQL query or another kind of query.

Figure 9:
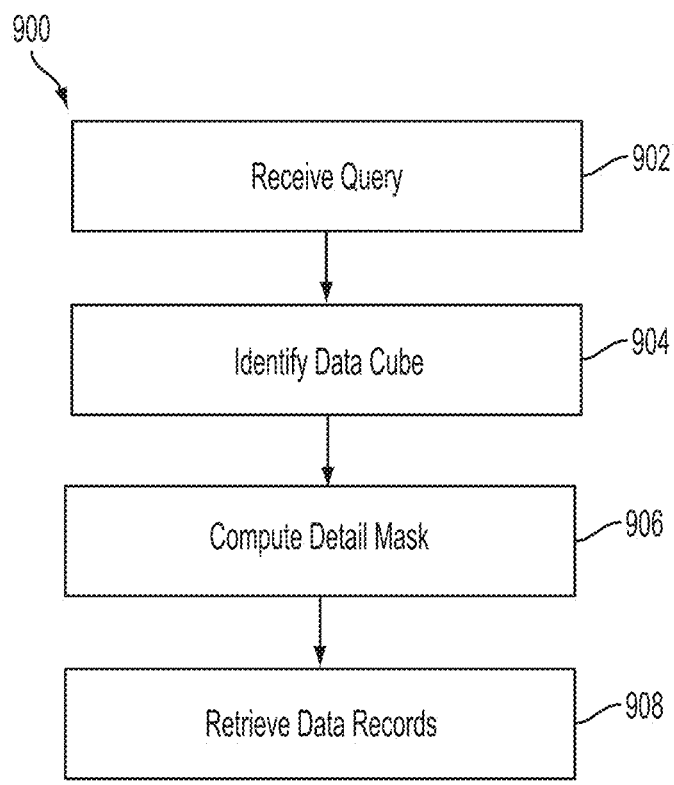

FIG. 9 shows a flowchart representing a procedure 900 for processing a query to access data of a data cube in storage other than a relational database, e.g., one or more flat files. The set of data records has at least two dimensions, and at least some of the data records each include respective data values for each of the at least two dimensions. The procedure 900 can be carried out, for example, by components of the record storage and retrieval system 200 shown in FIG. 2. In some examples, the procedure 900 is used to access data stored by the procedure 800 described above with respect to FIG. 8.

The procedure receives 902 a query. Typically a query includes at least one constraint upon at least one dimension of the set of data records.

The procedure identifies 904 a data cube storing data records, based on the query. For example, the query may specify a data source that corresponds to the data cube. An example of a data cube 100 is shown in FIGS. 1A-1D, which could be stored, for example, in the record storage 206 shown in FIG. 2.

The procedure computes 906 at least one detail mask for the query, the detail mask including a representation of one or more detail levels, each detail level corresponding to a hierarchy of a dimension of the data records.

The procedure retrieves 908, from a system other than a relational database, one or more data records responsive to the query, using the computed detail mask. In some examples, the data is retrieved in the form of data records, and in some examples, the data records are stored in one or more flat files.

In some examples, the procedure 900 also includes computing minimum and maximum values for one or more of the at least two dimensions, and using the minimum and minimum values to access a range of corresponding data records in the system, e.g., the corresponding blocks of data stored in one or more flat files. In some implementations, two primary keys are used to identify a start location and an end location of data records, such that a first primary key specifies a start location, and a second primary key specifies an end location.

In some examples, the procedure 900 includes identifying, based on a constraint upon the second dimension, a constraint upon the first dimension, and adding the identified constraint to the query. This technique is sometimes referred to as "hydrating," as described in detail above. In some examples, the constraint upon the first dimension is identified based on a census associated with the data cube, e.g., the census 600 described above with respect to FIG. 6.

In some examples, the procedure 900 includes determining that the query is a candidate for iterative optimization and carrying out at least two iterations of sub-queries to process the query.

The systems and techniques described herein can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer-implemented method for storing data of a data cube in one or more flat files, the flat files stored in a tangible, non-transitory computer-readable medium, the method including:
   receiving a set of data records, the set of data records having at least two dimensions, at least some of the data records each including respective data values for each of the at least two dimensions;
   generating a set of grouped data records ordered by cardinality, the generating including
      grouping the data records into subsets according to data values of a first dimension of the at least two dimensions, the first dimension having fewer possible data values than a number of possible data values for a second dimension,
      arranging the subsets of the grouped data records according to the data values of the first dimension and according to a sorting criterion, and
      arranging the data records of the subsets of the grouped data records according to data values of the second dimension of the at least two dimensions, such that data records of each respective subset of the grouped data are sorted by the values of the second dimension; and
   generating and storing at least one flat file containing the set of grouped data records;
   wherein a particular data record of the grouped data records includes a primary key that can be used to identify data of the particular data record in response to a request.

2. The method of claim 1, wherein the primary key includes at least some of the data values of the particular data record, and the primary key includes an element computed from at least one characteristic of at least two dimensions of the particular data record.

3. The method of claim 2, wherein the computed element of the primary key is a detail mask that includes a scalar representation of one or more detail levels, each detail level corresponding to a hierarchy of a dimension of the data record, wherein the at least one characteristics of the at least two dimensions include, for each of the two dimensions, presence of data at a particular level of the hierarchy.

4. The method of claim 3, wherein grouping the data records into subsets includes sorting the data records according to the detail mask.

5. The method of claim 1, including a hierarchy that includes at least two dimensions, wherein a first dimension of the at least two dimensions represents a first level of the hierarchy, and a second dimension of the at least two dimensions represents a second level of the hierarchy below the first level.

6. The method of claim 5, including processing a query to access one or more of the data records stored in the at least one flat file, the query including a constraint upon the second dimension, the processing including
   identifying, based on the constraint upon the second dimension, a constraint upon the first dimension, and adding the identified constraint to the query.

7. The method of claim 1, including processing a query to access one or more of the data records stored in the at least one flat file, the query including at least one constraint upon at least one dimension of the set of data records.

8. The method of claim 7, wherein processing the query includes computing at least one detail mask for the query, the detail mask including a scalar representation of one or more detail levels, each detail level corresponding to a hierarchy of a dimension of the data records stored in the flat file, and using the computed detail mask to identify one or more data records responsive to the query.

9. The method of claim 7, wherein processing the query includes computing minimum and maximum values for one or more of the at least two dimensions.

10. The method of claim 7, wherein processing the query includes determining that the query is a candidate for iterative optimization and carrying out at least two iterations of sub-queries to process the query.

11. The method of claim 1, including receiving a request to access one or more of the data records stored in the at least one flat file, the request including an identifier associated with the flat file, a first primary key specifying a start location in the flat file, and a second primary key specifying an end location in the flat file.

12. The method of claim 1, including processing a SQL query to access one or more of the data records stored in the at least one flat file.

13. The method of claim 1, wherein the grouped data records are stored in the at least one flat file in the form of blocks, each block including one or more of the data records; and including generating an index that includes one or more entries for each of the blocks, wherein the one or more of the entries for each of the blocks include a primary key field that identifies the respective block and a location field that identifies a storage location of the respective block within the at least one flat file.

14. The method of claim 1, including: receiving a primary key value;

identifying, based on the received primary key value and by using the primary key field and the location field, a storage location of one of the blocks that includes data records corresponding to a range of primary key values that includes the received primary key value.

15. The method claim 1, including:

pre-computing one or more values for different detail levels among the at least two dimensions, wherein the pre-computed values represent measures aggregated at different levels of dimensional detail, and wherein the grouped data records include at least some of the pre-computed values.

16. A data processing system including one or more hardware computer processors and capable of storing data of a data cube in one or more flat files, the data processing system configured to perform operations including:

receiving a set of data records, the set of data records having at least two dimensions, at least some of the data records each including respective data values for each of the at least two dimensions;

generating a set of grouped data records ordered by cardinality, the generating including grouping the data records into subsets according to data values of a first dimension of the at least two dimensions, the first dimension having fewer possible data values than a number of possible data values for a second dimension, arranging the subsets of the grouped data records according to the data values of the first dimension and according to a sorting criterion, and arranging the data records of the subsets of the grouped data records according to data values of the second dimension of the at least two dimensions, such that data records of each respective subset of the grouped data are sorted by the values of the second dimension; and generating and storing at least one flat file containing the set of grouped data records;

wherein a particular data record of the grouped data records includes a primary key that can be used to identify data of the particular data record in response to a request.

17. A non-transitory computer readable storage device storing instructions that enable a data processing system to be capable of storing data of a data cube in one or more flat files, the instructions causing the data processing system to perform operations including:

receiving a set of data records, the set of data records having at least two dimensions, at least some of the data records each including respective data values for each of the at least two dimensions;

generating a set of grouped data records ordered by cardinality, the generating including grouping the data records into subsets according to data values of a first dimension of the at least two dimensions, the first dimension having fewer possible data values than a number of possible data values for a second dimension, arranging the subsets of the grouped data records according to the data values of the first dimension and according to a sorting criterion, and arranging the data records of the subsets of the grouped data records according to data values of the second dimension of the at least two dimensions, such that data records of each respective subset of the grouped data are sorted by the values of the second dimension; and generating and storing at least one flat file containing the set of grouped data records;

wherein a particular data record of the grouped data records includes a primary key that can be used to identify data of the particular data record in response to a request.

18. A data processing system including one or more hardware computer processors and capable of storing data of a data cube in one or more flat files, the data processing system including:

means for receiving a set of data records, the set of data records having at least two dimensions, at least some of the data records each including respective data values for each of the at least two dimensions;

means for generating a set of grouped data records ordered by cardinality, the generating including grouping the data records into subsets according to data values of a first dimension of the at least two dimensions, the first dimension having fewer possible data values than a number of possible data values for a second dimension, arranging the subsets of the grouped data records according to the data values of the first dimension and according to a sorting criterion, and arranging the data records of the subsets of the grouped data records according to data values of the second dimension of the at least two dimensions, such that data records of each respective subset of the grouped data are sorted by the values of the second dimension; and means for generating and storing at least one flat file containing the set of grouped data records;

wherein a particular data record of the grouped data records includes a primary key that can be used to identify data of the particular data record in response to a request.

19. The data processing system of claim 16, wherein the primary key includes at least some of the data values of the particular data record, and the primary key includes an element computed from at least one characteristic of at least two dimensions of the particular data record.

20. The data processing system of claim 19, wherein the computed element of the primary key is a detail mask that includes a scalar representation of one or more detail levels, each detail level corresponding to a hierarchy of a dimension of the data record, wherein the at least one characteristics of the at least two dimensions include, for each of the two dimensions, presence of data at a particular level of the hierarchy.

21. The data processing system of claim 20, wherein grouping the data records into subsets includes sorting the data records according to the detail mask.

22. The data processing system of claim 16, the operations including a hierarchy that includes at least two dimensions, wherein a first dimension of the at least two dimensions represents a first level of the hierarchy, and a second dimension of the at least two dimensions represents a second level of the hierarchy below the first level.

23. The data processing system of claim 22, the operations including processing a query to access one or more of the data records stored in the at least one flat file, the query including a constraint upon the second dimension, the processing including
identifying, based on the constraint upon the second dimension, a constraint upon the first dimension, and adding the identified constraint to the query.

24. The data processing system of claim 16, the operations including processing a query to access one or more of the data records stored in the at least one flat file, the query including at least one constraint upon at least one dimension of the set of data records.

25. The data processing system of claim 24, wherein processing the query includes computing at least one detail mask for the query, the detail mask including a scalar representation of one or more detail levels, each detail level corresponding to a hierarchy of a dimension of the data records stored in the flat file, and using the computed detail mask to identify one or more data records responsive to the query.

26. The data processing system of claim 24, wherein processing the query includes computing minimum and maximum values for one or more of the at least two dimensions.

27. The data processing system of claim 24, wherein processing the query includes determining that the query is a candidate for iterative optimization and carrying out at least two iterations of sub-queries to process the query.

28. The data processing system of claim 16, the operations including receiving a request to access one or more of the data records stored in the at least one flat file, the request including an identifier associated with the flat file, a first primary key specifying a start location in the flat file, and a second primary key specifying an end location in the flat file.

29. The data processing system of claim 16, the operations including processing a SQL query to access one or more of the data records stored in the at least one flat file.

30. The data processing system of claim 16, wherein the grouped data records are stored in the at least one flat file in the form of blocks, each block including one or more of the data records; and including
generating an index that includes one or more entries for each of the blocks, wherein the one or more of the entries for each of the blocks include a primary key field that identifies the respective block and a location field that identifies a storage location of the respective block within the at least one flat file.

31. The data processing system of claim 16, the operations including:
receiving a primary key value;
identifying, based on the received primary key value and by using the primary key field and the location field, a storage location of one of the blocks that includes data records corresponding to a range of primary key values that includes the received primary key value.

32. The data processing system claim 16, the operations including:
pre-computing one or more values for different detail levels among the at least two dimensions, wherein the pre-computed values represent measures aggregated at different levels of dimensional detail, and wherein the grouped data records include at least some of the pre-computed values.

33. The non-transitory computer readable storage device of claim 17, wherein the primary key includes at least some of the data values of the particular data record, and the primary key includes an element computed from at least one characteristic of at least two dimensions of the particular data record.

34. The non-transitory computer readable storage device of claim 33, wherein the computed element of the primary key is a detail mask that includes a scalar representation of one or more detail levels, each detail level corresponding to a hierarchy of a dimension of the data record, wherein the at least one characteristics of the at least two dimensions include, for each of the two dimensions, presence of data at a particular level of the hierarchy.

35. The non-transitory computer readable storage device of claim 34, wherein grouping the data records into subsets includes sorting the data records according to the detail mask.

36. The non-transitory computer readable storage device of claim 17, the operations including a hierarchy that includes at least two dimensions, wherein a first dimension of the at least two dimensions represents a first level of the hierarchy, and a second dimension of the at least two dimensions represents a second level of the hierarchy below the first level.

37. The non-transitory computer readable storage device of claim 36, the operations including processing a query to access one or more of the data records stored in the at least one flat file, the query including a constraint upon the second dimension, the processing including
identifying, based on the constraint upon the second dimension, a constraint upon the first dimension, and adding the identified constraint to the query.

38. The non-transitory computer readable storage device of claim 17, the operations including processing a query to access one or more of the data records stored in the at least one flat file, the query including at least one constraint upon at least one dimension of the set of data records.

39. The non-transitory computer readable storage device of claim 38, wherein processing the query includes computing at least one detail mask for the query, the detail mask including a scalar representation of one or more detail levels, each detail level corresponding to a hierarchy of a dimension of the data records stored in the flat file, and using the computed detail mask to identify one or more data records responsive to the query.

40. The non-transitory computer readable storage device of claim 38, wherein processing the query includes computing minimum and maximum values for one or more of the at least two dimensions.

41. The non-transitory computer readable storage device of claim 38, wherein processing the query includes determining that the query is a candidate for iterative optimization and carrying out at least two iterations of sub-queries to process the query.

42. The non-transitory computer readable storage device of claim 17, the operations including receiving a request to access one or more of the data records stored in the at least one flat file, the request including an identifier associated with the flat file, a first primary key specifying a start location in the flat file, and a second primary key specifying an end location in the flat file.

43. The non-transitory computer readable storage device of claim 17, the operations including processing a SQL query to access one or more of the data records stored in the at least one flat file.

44. The non-transitory computer readable storage device of claim 17, wherein the grouped data records are stored in the at least one flat file in the form of blocks, each block including one or more of the data records; and including generating an index that includes one or more entries for each of the blocks, wherein the one or more of the entries for each of the blocks include a primary key field that identifies the respective block and a location field that identifies a storage location of the respective block within the at least one flat file.

45. The non-transitory computer readable storage device of claim 17, the operations including:

receiving a primary key value;

identifying, based on the received primary key value and by using the primary key field and the location field, a storage location of one of the blocks that includes data records corresponding to a range of primary key values that includes the received primary key value.

46. The non-transitory computer readable storage device claim 17, the operations including:

pre-computing one or more values for different detail levels among the at least two dimensions, wherein the pre-computed values represent measures aggregated at different levels of dimensional detail, and wherein the grouped data records include at least some of the pre-computed values.

* * * * *

UNITED STATES PATENT AND TRADEMARK OFFICE
CERTIFICATE OF CORRECTION

PATENT NO. : 10,210,236 B2  
APPLICATION NO. : 14/949391  
DATED : February 19, 2019  
INVENTOR(S) : Roy Procops and David Trahan It is certified that error appears in the above-identified patent and that said Letters Patent is hereby corrected as shown below:

In the Claims

Column 27, Line 19, Claim 15, after "method" insert -- of --.

Column 29, Line 60, Claim 32, after "system" insert -- of --.

Column 31, Line 19, Claim 46, after "device" insert -- of --.

Signed and Sealed this  
Sixteenth Day of April, 2019

Andrei Iancu  
*Director of the United States Patent and Trademark Office*